(12) United States Patent
Sakai et al.

(10) Patent No.: US 7,948,580 B2
(45) Date of Patent: May 24, 2011

(54) LIQUID CRYSTAL DISPLAY

(75) Inventors: Takehiko Sakai, Matsusaka (JP);
Tsuyoshi Okazaki, Nara (JP);
Katsuhiko Morishita, Matsusaka (JP);
Yoshiharu Kataoka, Tsu (JP);
Chikanori Tsukamura, Tsu (JP); Dai Chiba, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 222 days.

(21) Appl. No.: 12/293,911

(22) PCT Filed: Dec. 21, 2006

(86) PCT No.: PCT/JP2006/325480
§ 371 (c)(1),
(2), (4) Date: Sep. 22, 2008

(87) PCT Pub. No.: WO2007/138731
PCT Pub. Date: Dec. 6, 2007

(65) Prior Publication Data
US 2009/0096954 A1    Apr. 16, 2009

(30) Foreign Application Priority Data

May 31, 2006   (JP) .................. 2006-152824

(51) Int. Cl.
*G02F 1/1335*   (2006.01)
*G02F 1/1347*   (2006.01)
*G02F 1/1337*   (2006.01)

(52) U.S. Cl. ............ 349/64; 349/74; 349/117; 349/119; 349/127

(58) Field of Classification Search .................. 349/74, 349/117, 119, 127
See application file for complete search history.

(56) References Cited

U.S. PATENT DOCUMENTS

| | | | |
|---|---|---|---|
| 4,942,464 A | 7/1990 | Milatz | |
| 5,677,747 A | 10/1997 | Ishikawa et al. | |
| 5,780,825 A | 7/1998 | Sato et al. | |
| 5,812,226 A | 9/1998 | Izumi et al. | |
| 5,877,829 A | 3/1999 | Okamoto et al. | |
| 6,000,806 A | 12/1999 | Dallman | |
| 6,199,754 B1 | 3/2001 | Epstein | |
| 6,211,930 B1 | 4/2001 | Sautter et al. | |
| 6,385,139 B1 | 5/2002 | Arikawa et al. | |
| 6,726,101 B1 | 4/2004 | McIntyre et al. | |
| 6,983,879 B2 | 1/2006 | Ramachandran et al. | |
| 7,068,336 B2 | 6/2006 | Oh et al. | |

(Continued)

FOREIGN PATENT DOCUMENTS

CN   1632659 A   6/2005

(Continued)

OTHER PUBLICATIONS

U.S. Appl. No. 12/294,146, filed Sep. 23, 2009, entitled "Display System".

(Continued)

*Primary Examiner* — Uyen-Chau N Le
*Assistant Examiner* — Chris H Chu
(74) *Attorney, Agent, or Firm* — Nixon & Vanderhye P.C.

(57) ABSTRACT

A liquid crystal display includes a backlight (3), a liquid crystal display panel (1), and a viewing angle control panel (2) for controlling the viewing angle of the display panel (1), the liquid crystal display further including a lens sheet (41) provided between the backlight (3) and the liquid crystal display panel (1). This provides a display device system which is capable of providing better blocking.

7 Claims, 22 Drawing Sheets

U.S. PATENT DOCUMENTS

| | | |
|---|---|---|
| 7,468,770 B2 | 12/2008 | Okumura |
| 2001/0026632 A1 | 10/2001 | Tamai |
| 2002/0084915 A1 | 7/2002 | Budnovitch |
| 2002/0139842 A1 | 10/2002 | Swaine |
| 2002/0176164 A1* | 11/2002 | Motomura et al. ............ 359/487 |
| 2005/0129273 A1 | 6/2005 | Pryor |
| 2005/0190318 A1* | 9/2005 | Okumura et al. ............... 349/95 |
| 2005/0190329 A1* | 9/2005 | Okumura ....................... 349/123 |
| 2006/0066785 A1 | 3/2006 | Moriya |
| 2006/0103782 A1* | 5/2006 | Adachi et al. .................... 349/96 |
| 2006/0180652 A1 | 8/2006 | Meek et al. |
| 2008/0012936 A1 | 1/2008 | White |
| 2008/0088587 A1 | 4/2008 | Pryor |

FOREIGN PATENT DOCUMENTS

| | | |
|---|---|---|
| GB | 2418518 | 3/2006 |
| JP | 62-84020 | 5/1987 |
| JP | 08-114795 | 5/1996 |
| JP | 10-268251 | 10/1998 |
| JP | 11-174489 | 7/1999 |
| JP | 2000-206522 | 7/2000 |
| JP | 2003-100126 A | 4/2003 |
| JP | 2005-004488 | 1/2005 |
| JP | 2005-266847 | 9/2005 |
| JP | 2005-345799 A | 12/2005 |
| KR | 1999-0074569 A | 10/1999 |

OTHER PUBLICATIONS

International Search Report for PCT/JP2006/325480 mailed Mar. 27, 2007.

Official Action mailed Nov. 26, 2010 in U.S. Appl. No. 12/294,146, filed Sep. 23, 2008.

Official Action mailed Aug. 3, 2010 in U.S. Appl. No. 12/294,146, filed Sep. 23, 2008.

* cited by examiner (a)

(b)

(c)

(a)

(b) LUMINANCE CHARACTERISTIC (AT WIDE VIEWING ANGLE)
HORIZONTAL DIRECTION (c) LUMINANCE CHARACTERISTIC (AT WIDE VIEWING ANGLE)
VERTICAL DIRECTION (a)

(b)

(c)

SOLID LINE: CASE IN WHICH 10V VOLTAGE IS APPLIED TO RETARDATION CONTROLLING DEVICE
BROKEN LINE: CASE IN WHICH NO VOLTAGE IS APPLIED TO RETARDATION CONTROLLING DEVICE (a)

(b)

LUMINANCE CHARACTERISTIC (AT NARROW VIEWING ANGLE) HORIZONTAL DIRECTION (c)

LUMINANCE CHARACTERISTIC (AT NARROW VIEWING ANGLE) VERTICAL DIRECTION

LIQUID CRYSTAL DISPLAY

This application is the U.S. national phase of International Application No. PCT/JP2006/325480, filed 21 Dec. 2006 which designated the U.S. and claims priority to Japanese Application No. 2006-152824, filed 31 May 2006, the entire contents of each of which are hereby incorporated by reference.

TECHNICAL FIELD

The technology presented herein relates to a liquid crystal display which includes a viewing angle control panel for controlling the viewing angle of a display panel.

BACKGROUND ART AND SUMMARY

Display devices are generally required to have as wide a viewing angle as possible so that a clear image can be seen from any angle. Various technological developments have been carried out in connection with widening of the viewing angle of liquid crystal display devices. This is particularly because liquid crystal display devices, which have been in widespread use in recent years, include liquid crystal having viewing angle dependence.

However, a narrow viewing angle may be preferable, in a specific use environment. This allows a display content to be visible only to the user. Furthermore, electronic devices such as laptop personal computers, personal data assistants (PDAs), and portable phones are particularly likely to be used in sites, where the general public may be present, such as in trains and airplanes. In such a use environment, the display device has preferably a narrow viewing angle because it is undesirable to let other people nearby see a display content, in light of reason such as confidentiality protection or privacy protection. As described above, there have been increasing demands in recent years for the ability to switch a viewing angle of a single display device between a wide viewing angle and a narrow viewing angle, in conformity with a use condition. Note that the demands are shared by any display devices, not limited to liquid crystal display devices.

In order to address such demands, Patent Document 1, for example, suggests an arrangement in which a retardation controlling device and a display device for displaying an image are provided and a viewing angle characteristic is changed by controlling a voltage applied to the retardation controlling device. According to Patent Document 1, the liquid crystal used in the retardation controlling liquid crystal display device is exemplified by a chiral nematic liquid crystal, a homogeneous liquid crystal, a randomly aligned nematic liquid crystal, and the like.

Further, Patent Documents 2 and 3, for example, disclose arrangements in which a viewing angle controlling liquid crystal panel is provided above a liquid crystal display panel, these panels are sandwiched by two polarizing plates, and a voltage applied to the viewing angle controlling liquid crystal panel is adjusted so that a viewing angle is controlled. According to Patent Document 2, the liquid crystal of the viewing angle controlling liquid crystal panel is a twisted nematic liquid crystal.

[Patent Document 1] Japanese Unexamined Patent Application Publication No. 174489/1999 (Tokukaihei 11-174489; published on Jul. 2, 1999)

[Patent Document 2] Japanese Unexamined Patent Application Publication No. 268251/1998 (Tokukaihei 10-268251; published on Oct. 9, 1998)

[Patent Document 3] Japanese Unexamined Patent Application Publication No. 309020/2005 (Tokukai 2005-309020; published on Nov. 4, 2005)

According to the Patent Document 1, the provision of the retardation controlling liquid crystal device allows switching between a wide viewing angle mode and a narrow viewing angle mode. However, this does not give rise to sufficient effect. For example, Patent Document 1 shows an equal-contrast curve for a contrast ratio of 10:1, as shown in FIG. 20. This shows that the contrast in a wide viewing angle direction is surely decreased in the narrow viewing angle mode. However, a decrease in contrast to such a degree causes a display to be sufficiently visible to a person next to the user. This is because a display is in general sufficiently visible even if the contrast ratio is decreased, for example, to 2:1.

According to the arts disclosed in Patent Documents 2 and 3, switching between a wide viewing angle and a narrow viewing angle is carried out by changing the voltage applied to the viewing angle controlling liquid crystal panel so that the contrast is adjusted. However, this does not give rise to sufficient effect, either. For example, (a) through (c) of FIG. 21, show viewing angle distributions in the wide viewing angle mode. (a) through (c) of FIG. 22 show viewing angle distributions in the narrow viewing angle mode.

Namely, all of the arts disclosed in Patent Documents 1, 2, and 3 adopt a method in which the switching between a wide viewing angle mode and a narrow viewing angle mode is carried out by decreasing the contrast in the wide viewing angle direction. However, according to such a method, blocking off of a view in the narrow viewing angle mode is not sufficient in the wide viewing angle direction, i.e., in a direction in which the narrow viewing angle is not realized. This is likely to cause a problem that a display may be seen by other people.

The present technology addresses the problem discussed above, and aims to provide a liquid crystal display which is capable of enhancing effect of narrowing a viewing angle.

In order to solve the above problem, a liquid crystal display of an example embodiment presented herein includes: a backlight; a display panel; a viewing angle control panel for controlling a viewing angle of the display panel; and a lens sheet provided either (i) between the backlight and the display panel which is provided so as to be closer to the backlight than to the viewing angle control panel, or (ii) between the backlight and the viewing angle control panel which is provided so as to be closer to the backlight than to the display panel.

According to the above embodiment, a lens sheet is provided either (i) between the backlight and the display panel which is provided so as to be closer to the backlight than to the viewing angle control panel, or (ii) between the backlight and the viewing angle control panel which is provided so as to be closer to the backlight than to the display panel. This allows the lens sheet to collect light emitted from the backlight, so that the viewing angle of the liquid crystal display can be narrowed.

As a result, it is possible to provide a liquid crystal display which is capable of better narrowing a viewing angle.

In order to solve the above problem, a liquid crystal display of the present embodiment includes: a backlight; a display panel; a viewing angle control panel for controlling a viewing angle of the display panel; and a plurality of layered lens sheets provided either (i) between the backlight and the display panel which is provided so as to be closer to the backlight than to the viewing angle control panel, or (ii) between the backlight and the viewing angle control panel which is provided so as to be closer to the backlight than to the display panel.

The plurality of layered lens sheets is capable of collecting light emitted from the backlight more closely than a signal lens sheet.

The liquid crystal display may be arranged such that the plurality of layered lens sheets are made up of a first lens sheet and a second lens sheet, the first lens sheet being provided so as to be closer to the backlight and having a prism ridgeline pattern which is vertically stripped with respect to the display panel, and the second lens sheet being provided on the first lens sheet and having a prism ridgeline pattern which is horizontally stripped with respect to the display panel.

This allows the first lens sheet having a vertically-stripped prism ridgeline pattern to collect light emitted from the backlight so that the viewing angle can be narrowed in the horizontal direction. The above arrangement further allows the second lens sheet having a horizontally-stripped prism ridge pattern to collect light emitted from the backlight so that the viewing angle can be narrowed in the vertical direction.

As a result, it is possible to efficiently narrow the viewing angle both in the horizontal and vertical directions with the use of the first and second lens sheets.

The liquid crystal display may be arranged such that each of the display panel and the viewing angle control panel includes a liquid crystal cell, the liquid crystal display, further including: at least one polarizing plate, which has not been subjected to a diffusion treatment, provided between the liquid crystal cell of the display panel and the liquid crystal cell of the viewing angle control panel.

Since at least one polarizing plate, which has not been subjected to a diffusion treatment, is provided between the respective liquid crystal cells of the display panel and the viewing angle control panel, narrowing of a viewing angle is not inhibited. In other words, for example, if a polarizing plate, which has been subjected to a diffusion treatment, is provided between the respective liquid crystal cells of the display panel and the viewing angle control panel, narrowing of a viewing angle is inhibited.

The liquid crystal display may preferably be arranged such that the viewing angle control panel includes: a liquid crystal cell; and a driving circuit for applying a voltage to the liquid crystal layer, the liquid crystal cell including: a pair of light-transmitting substrates; and a liquid crystal layer, provided between the light-transmitting substrates, in which liquid crystal molecules are aligned vertically, and the liquid crystal cell being provided between two polarizing plates which face each other so that polarizing transmission axes are substantially orthogonal to each other, and the driving circuit changing an alignment of the liquid crystal molecules in the liquid crystal layer of the liquid crystal cell so that a display state is switched between a first viewing angle range and a second viewing angle range which is within the first viewing angle range and is narrower than the first viewing angle range.

According to the above embodiment, two polarizing plates having polarizing transmission axes which are substantially orthogonal to each other are provided so as to sandwich the liquid crystal cell of the viewing angle control panel. The liquid crystal cell and the two polarizing plates are not necessarily in contact with each other. There may be another element between the liquid crystal cell and the two polarizing plates.

According to the above arrangement, the polarization of light to be emitted from the liquid crystal cell of the viewing angle control panel is changed due to birefringence which is caused by the liquid crystal when the alignment of the liquid crystal molecules is changed while a predetermined voltage applied to the liquid crystal layer. As a result, it is possible to, depending on the angle, transmit or block the light to be emitted from the viewing angle control panel toward a viewer, while the polarizing plate provided on a side of the viewing angle control panel which side faces the viewer serves as an analyzer. In other words, the display mode can be switched between (i) a wide viewing angle mode which provides the first viewing angle range and (ii) a narrow viewing angle mode which provides the second viewing angle range, which is within the first viewing angle range and narrower than the first viewing angle range. Note that the terms "wide viewing angle" and "narrow viewing angle" do not refer to any specific, absolute angle ranges. They refer to a relatively wide viewing angle and a relatively narrow viewing angle, respectively.

Further, according to the above arrangement, the use of the liquid crystal cell having liquid crystal molecules aligned vertically allows the narrow viewing angle mode to be achieved in which mode a display is visible from within a limited viewing angle. Consequently, unlike the conventional art of controlling a viewing angle in which art the contrast of a display in the wide viewing angle direction is decreased, the viewing angle can be controlled by switching between transmitting of light and blocking of light. As a result, the liquid crystal display is capable of better narrowing a viewing angle in the narrow viewing angle mode.

In order to solve the above problem, a liquid crystal display of the present embodiment includes: a backlight; a display panel; and a viewing angle control panel for controlling a viewing angle of the display panel, each of the display panel and the viewing angle control panel including a liquid crystal cell, the liquid crystal display, further including: at least one polarizing plate, which has not been subjected to a diffusion treatment, provided between the liquid crystal cell of the display panel and the liquid crystal cell of the viewing angle control panel.

According to the above embodiment, the liquid crystal display includes a backlight, a display panel, and a viewing angle control panel for controlling a viewing angle of the display panel.

Further, each of the display panel and the viewing angle control panel includes a liquid crystal cell, and at least one polarizing plate, which has not been subjected to a diffusion treatment, is provided between the respective liquid crystal cells of the display panel and the viewing angle control panel. Thus, even if a lens sheet is not provided, the liquid crystal display simply having the above arrangement is capable of better narrowing a viewing angle.

For a fuller understanding of the nature and advantages of the example embodiments presented herein, reference should be made to the ensuing detailed description taken in conjunction with the accompanying drawings.

Figure 3:
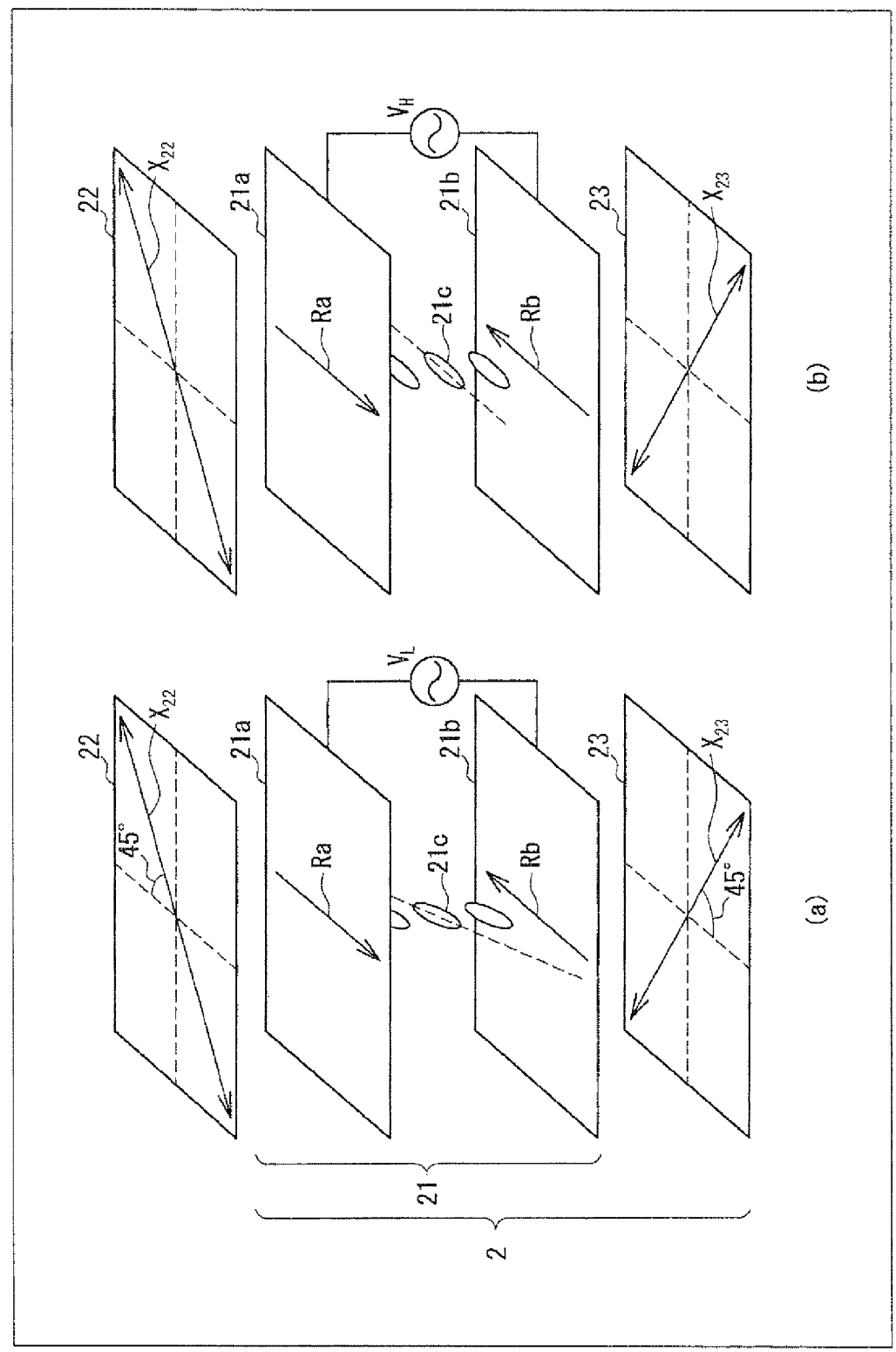

(a) of FIG. 3 is a perspective view of the alignment of liquid crystal molecules of the viewing angle control panel in a narrow viewing angle mode, and (b) of FIG. 3 is a perspective view of the alignment of the liquid crystal molecules of the viewing angle control panel in a wide viewing angle mode.

Figure 4:
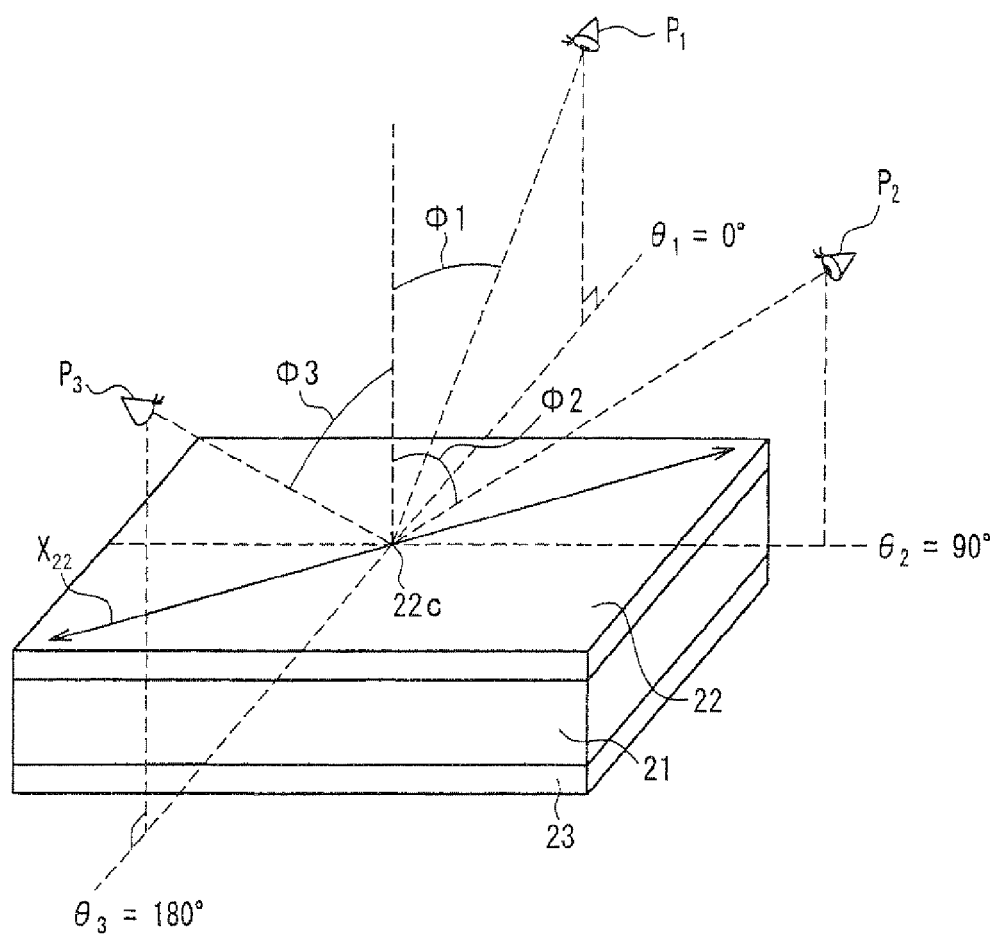

FIG. 4 is a schematic view defining angles with respect to a laminate of the viewing angle control panel and a second polarizing plate which are disposed in the same orientation as in (a) and (b) of FIG. 3.

Figure 5:
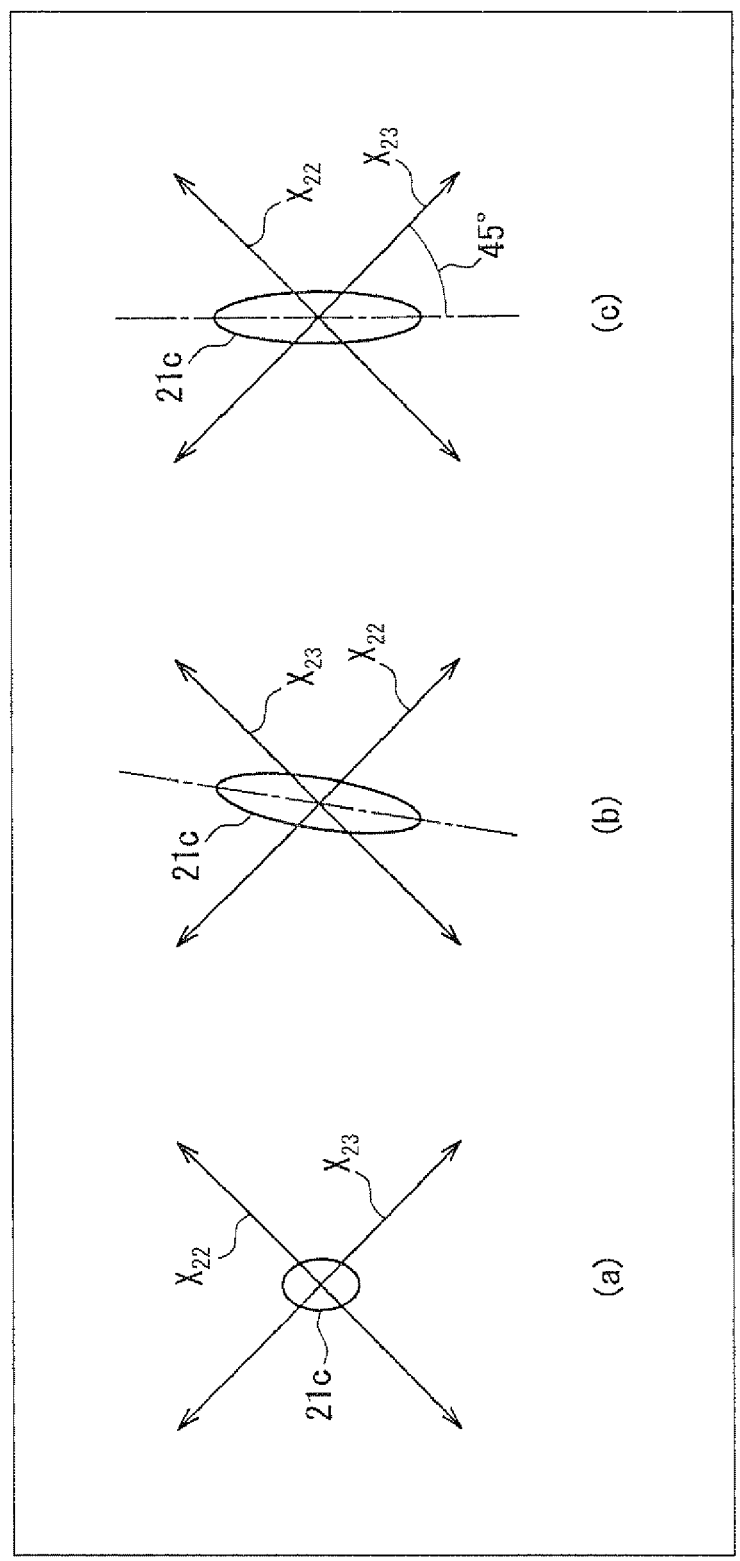

(a), (b), and (c) of FIG. 5 are views illustrating the positional relationship between a liquid crystal molecule and polarizing transmission axes at respective angles.

Figure 6:
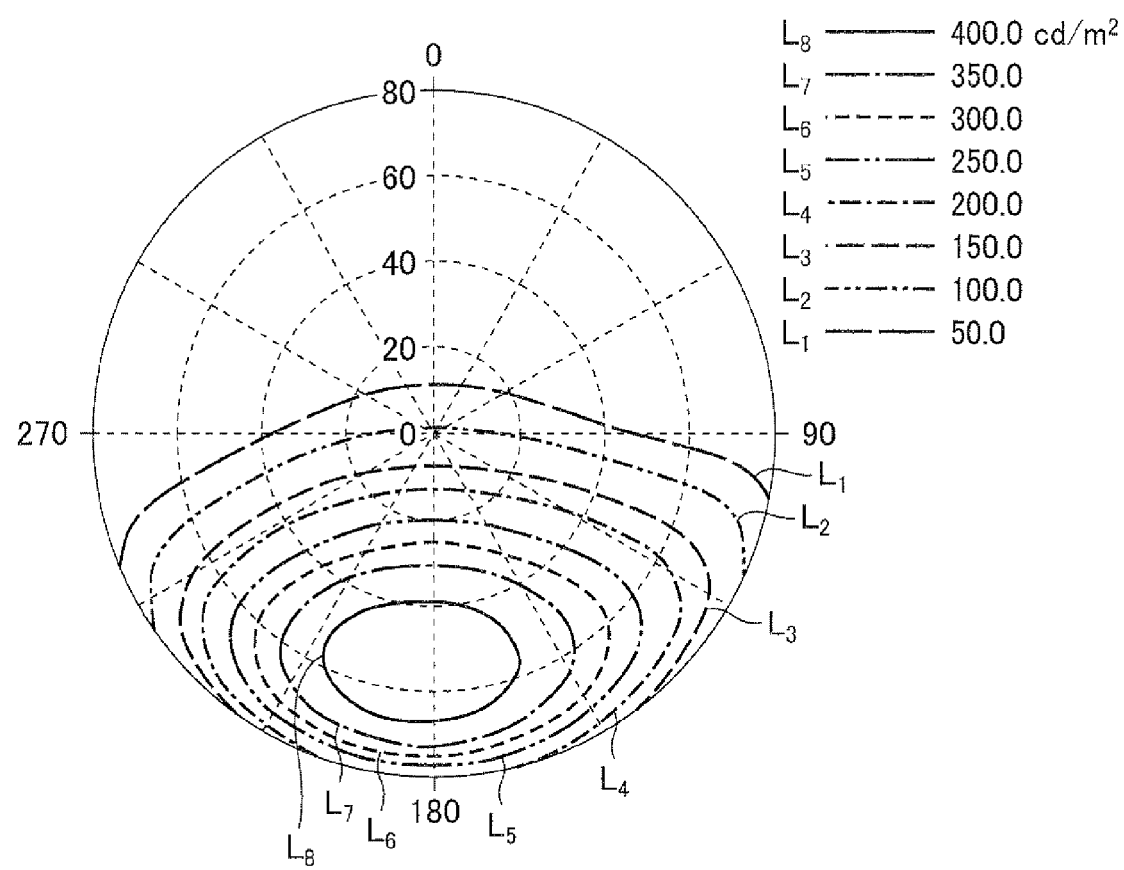

FIG. 6 is a chart illustrating a luminance distribution in the narrow viewing angle mode of the liquid crystal display.

Figure 7:
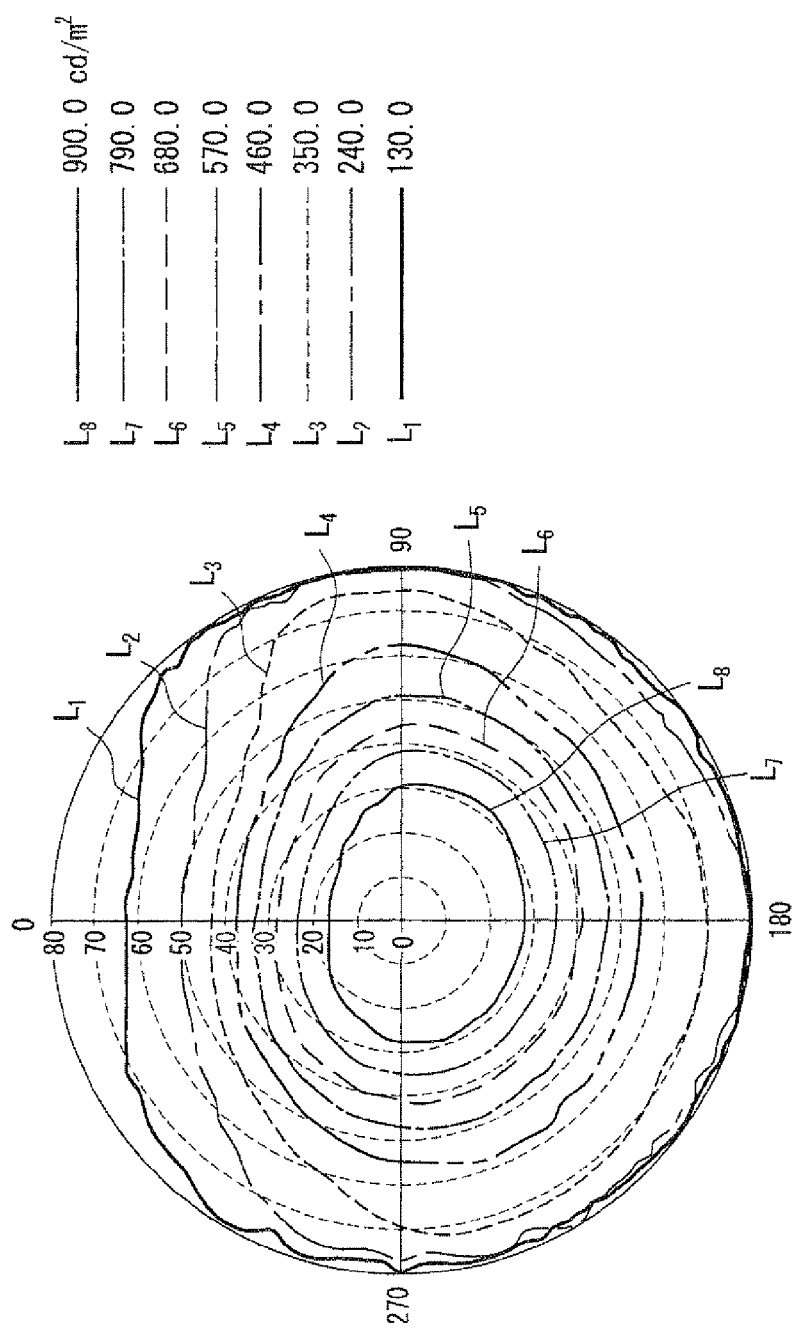

FIG. 7 is a chart illustrating a luminance distribution in the wide viewing angle mode of the liquid crystal display.

Figure 8:
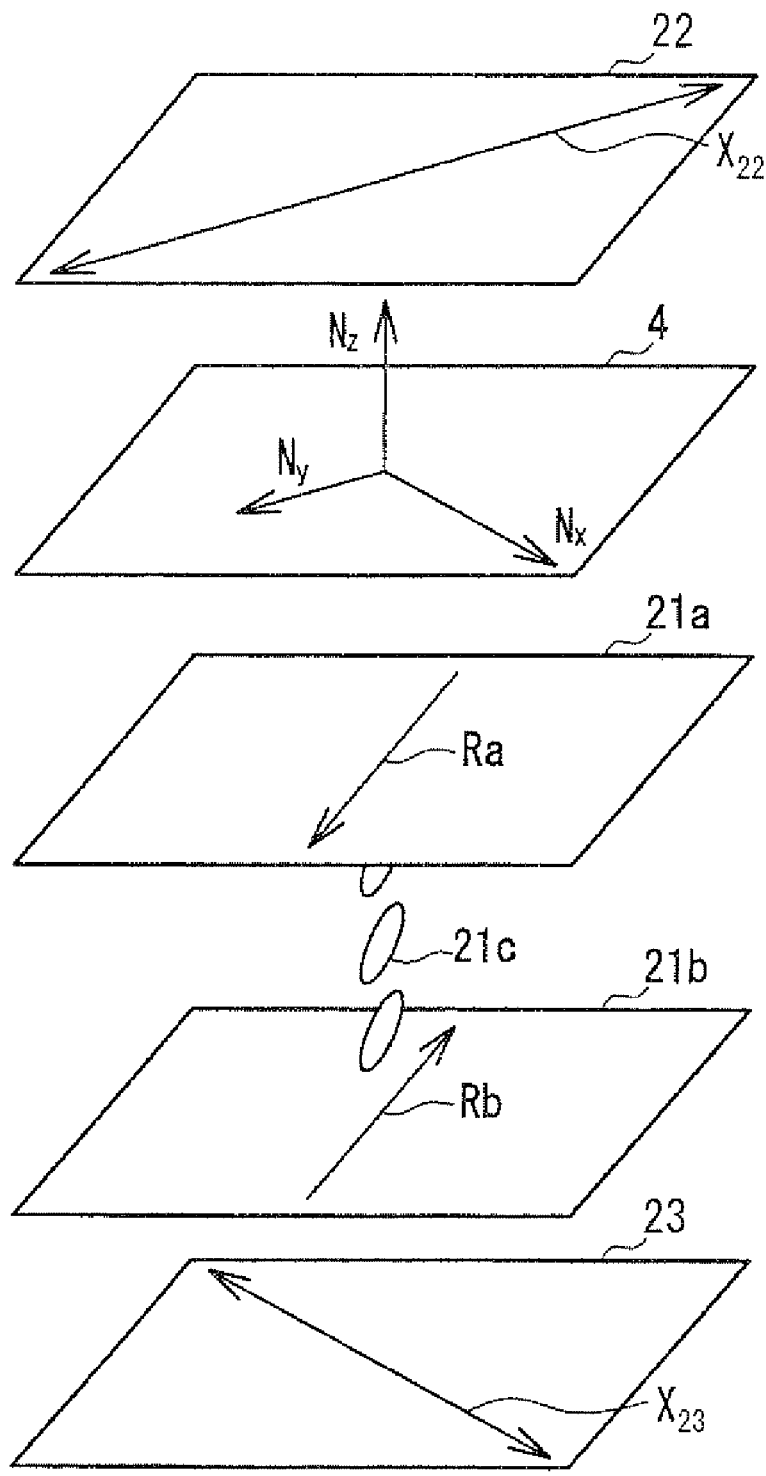

FIG. 8 is a schematic view of a structure of a viewing angle control panel included in the liquid crystal display, including a retardation film between a light-transmitting substrate and a polarizing plate.

Figure 9:
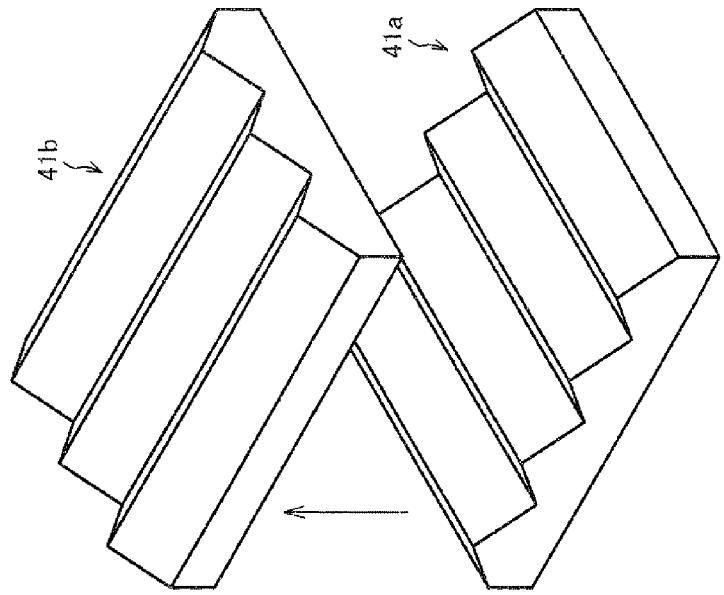
Figure 9:
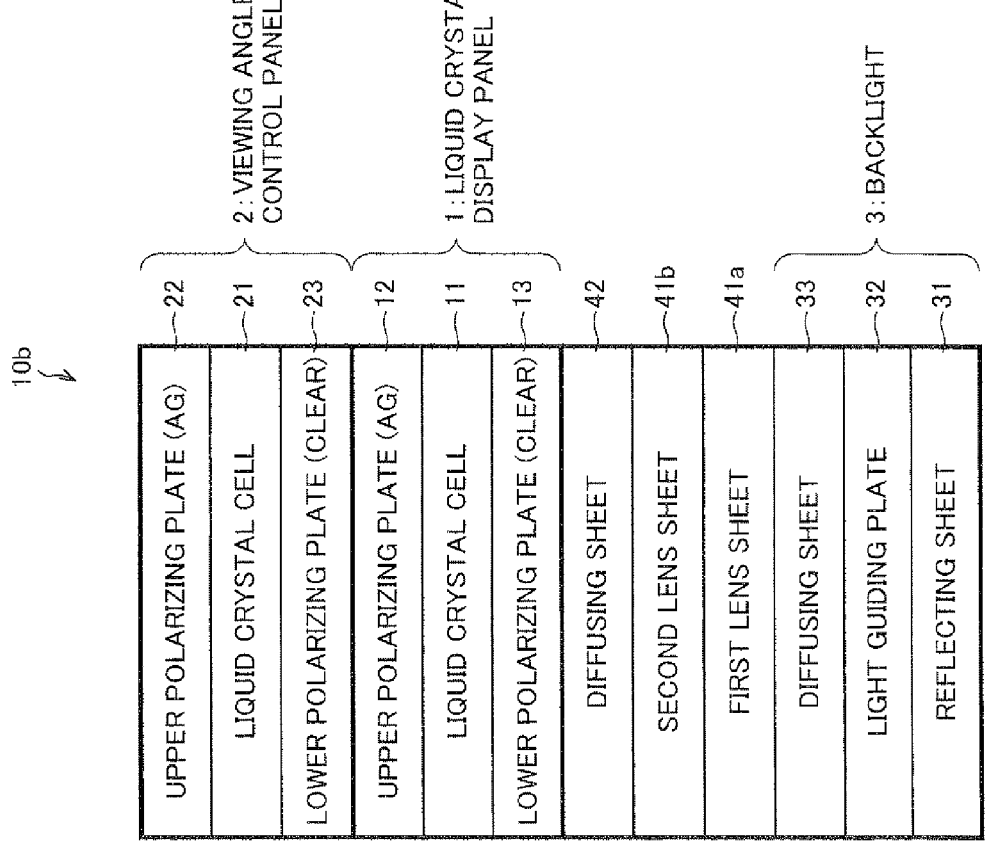

FIG. 9 (a) is a sectional view illustrating a structure of a liquid crystal display which includes a lens sheet formed of first and second lens sheets.

FIG. 9 (b) is an exploded perspective view of how the first and second lens sheets are layered.

Figure 10:
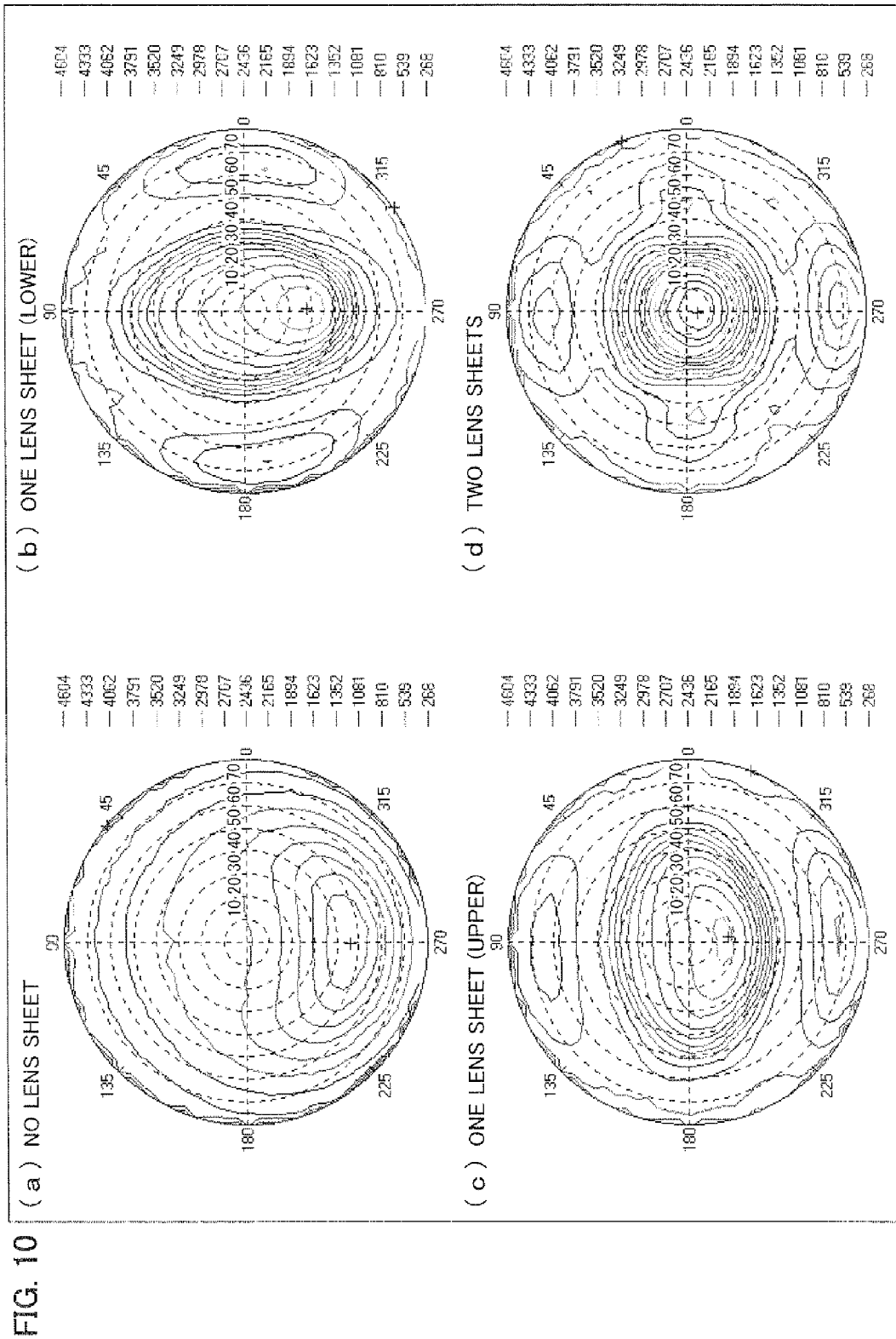

(a) of FIG. 10 is a chart illustrating a luminance distribution of a general liquid crystal display which includes no lens sheet; (b) of FIG. 10 is a chart illustrating a luminance distribution of a general liquid crystal display which includes the first lens sheet; (c) of FIG. 10 is a chart illustrating a luminance distribution of a general liquid crystal display which includes the second lens sheet; and (d) of FIG. 10 is a chart illustrating a luminance distribution of a general liquid crystal display which includes the first and second lens sheets.

Figure 11:
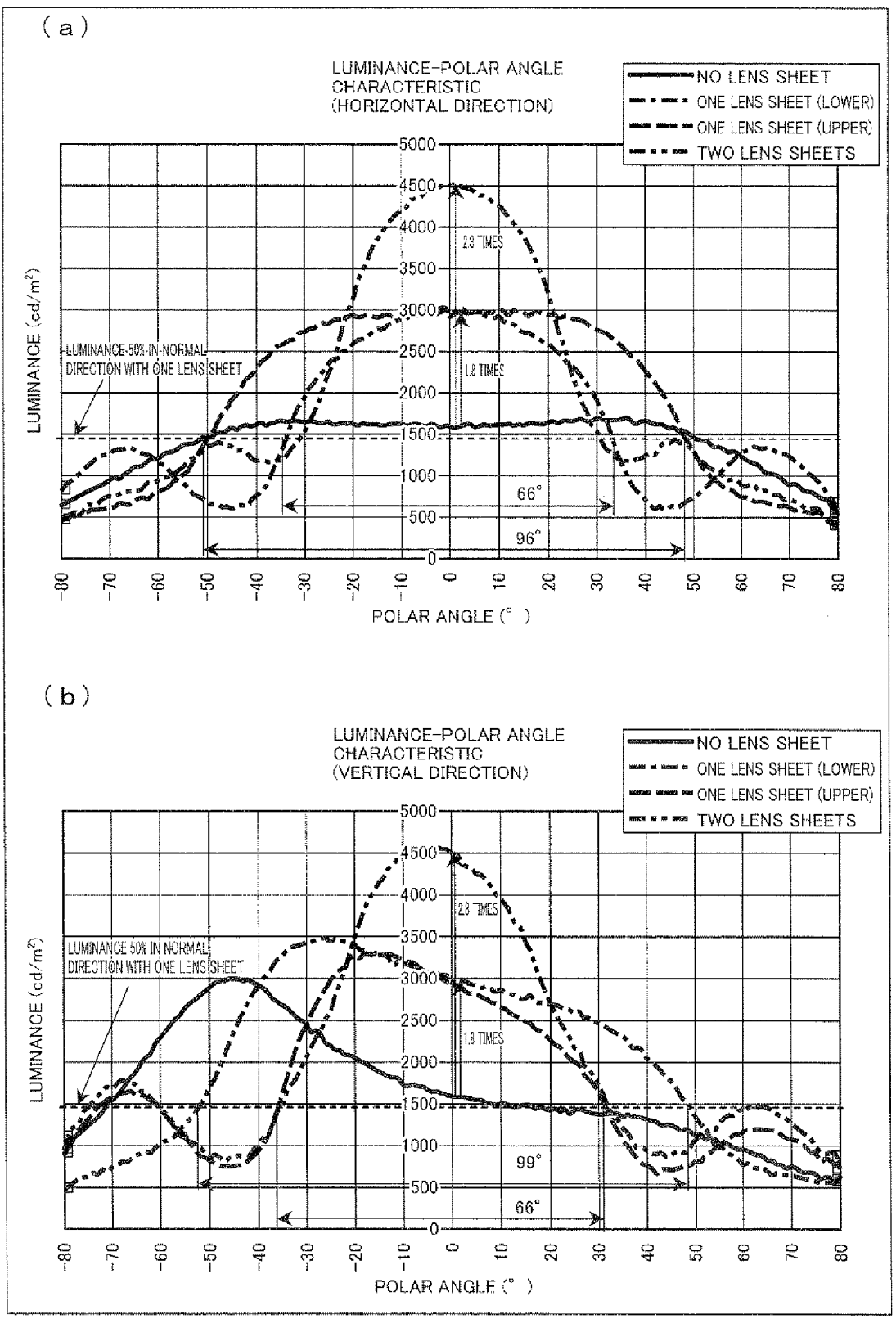

(a) of FIG. 11 which is a graph illustrating luminance-polar angle characteristics in the horizontal direction with regard to (a) through (d) of FIG. 10; and (b) of FIG. 11 is a graph illustrating luminance-polar angle characteristics in the vertical direction with regard to (a) through (d) of FIG. 10.

Figure 12:
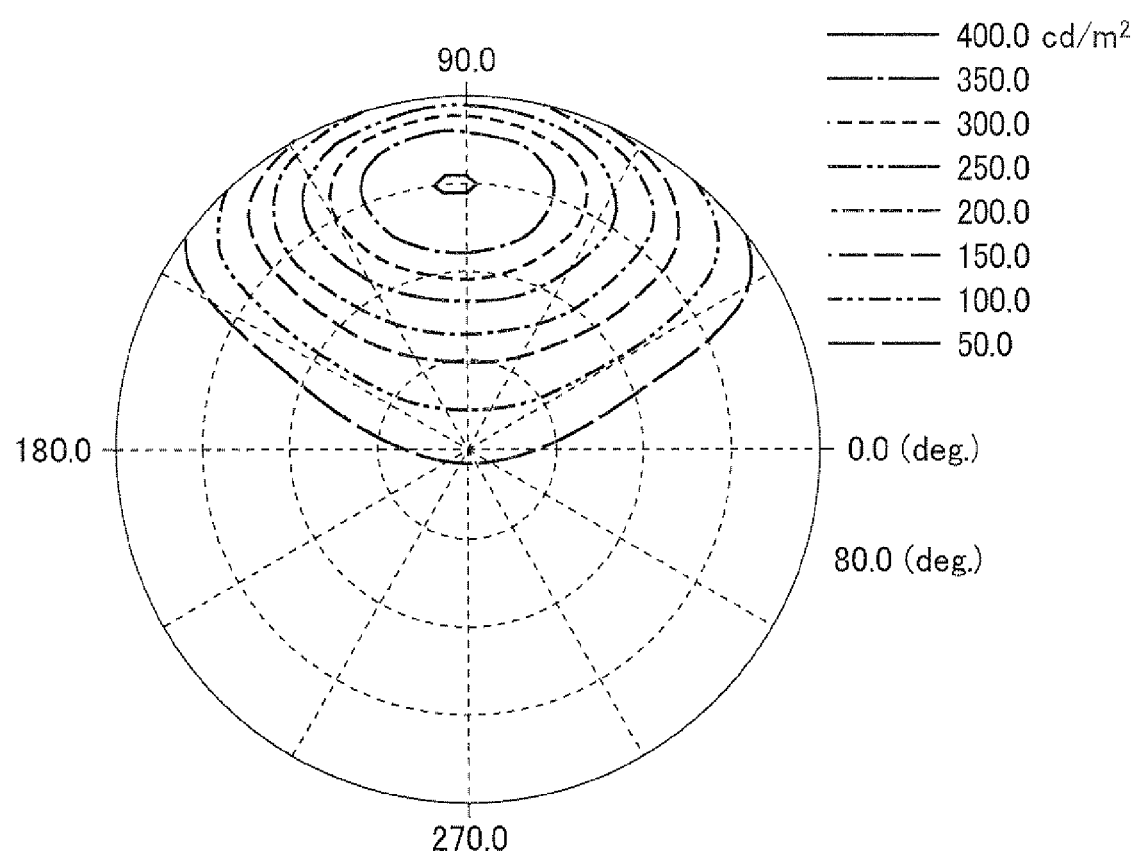

FIG. 12 is a chart illustrating a luminance distribution in the narrow viewing angle mode of the liquid crystal display which includes the first and second lens sheets which are layered.

Figure 13:
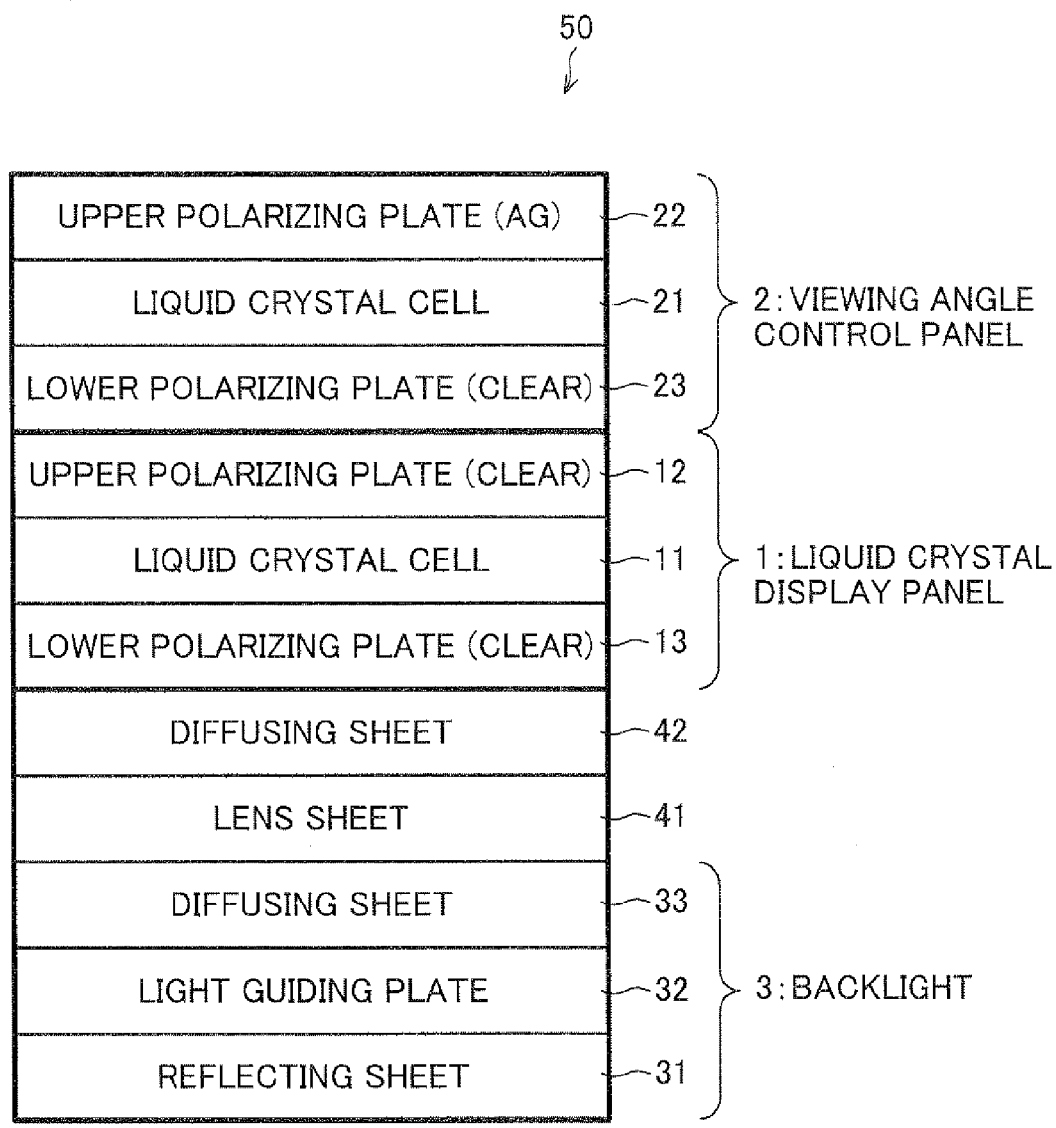

FIG. 13 is a sectional view of a liquid crystal display in which both of the polarizing plates provided between the viewing angle control panel and the liquid crystal display panel are clear polarizing plates, and a lens sheet is provided, in accordance with another embodiment.

Figure 14:
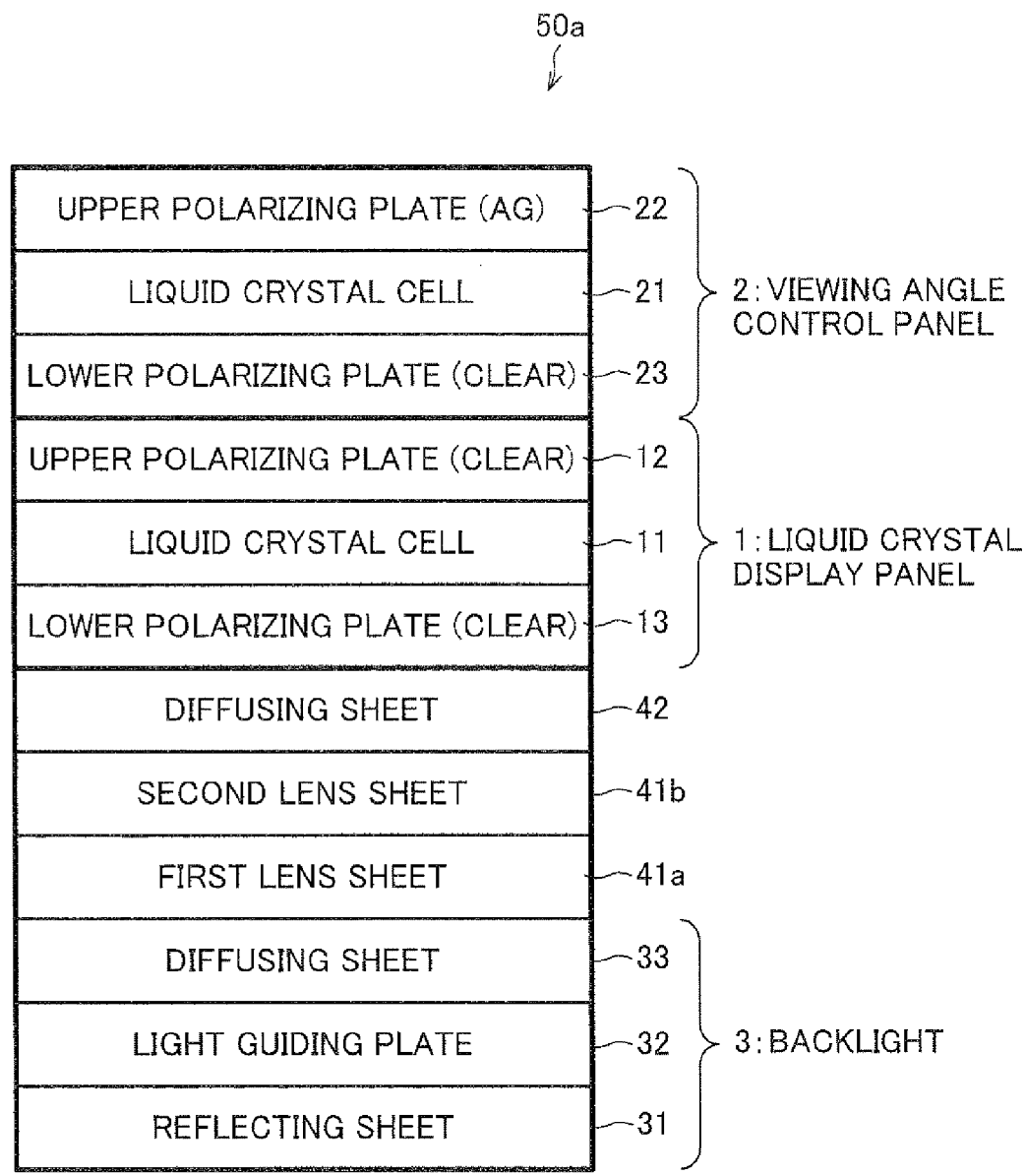

FIG. 14 is a sectional view of a modification of the liquid crystal display in FIG. 13, including two lens sheets, i.e., a first lens sheet and a second lens sheet, in place of the lens sheet.

Figure 15:
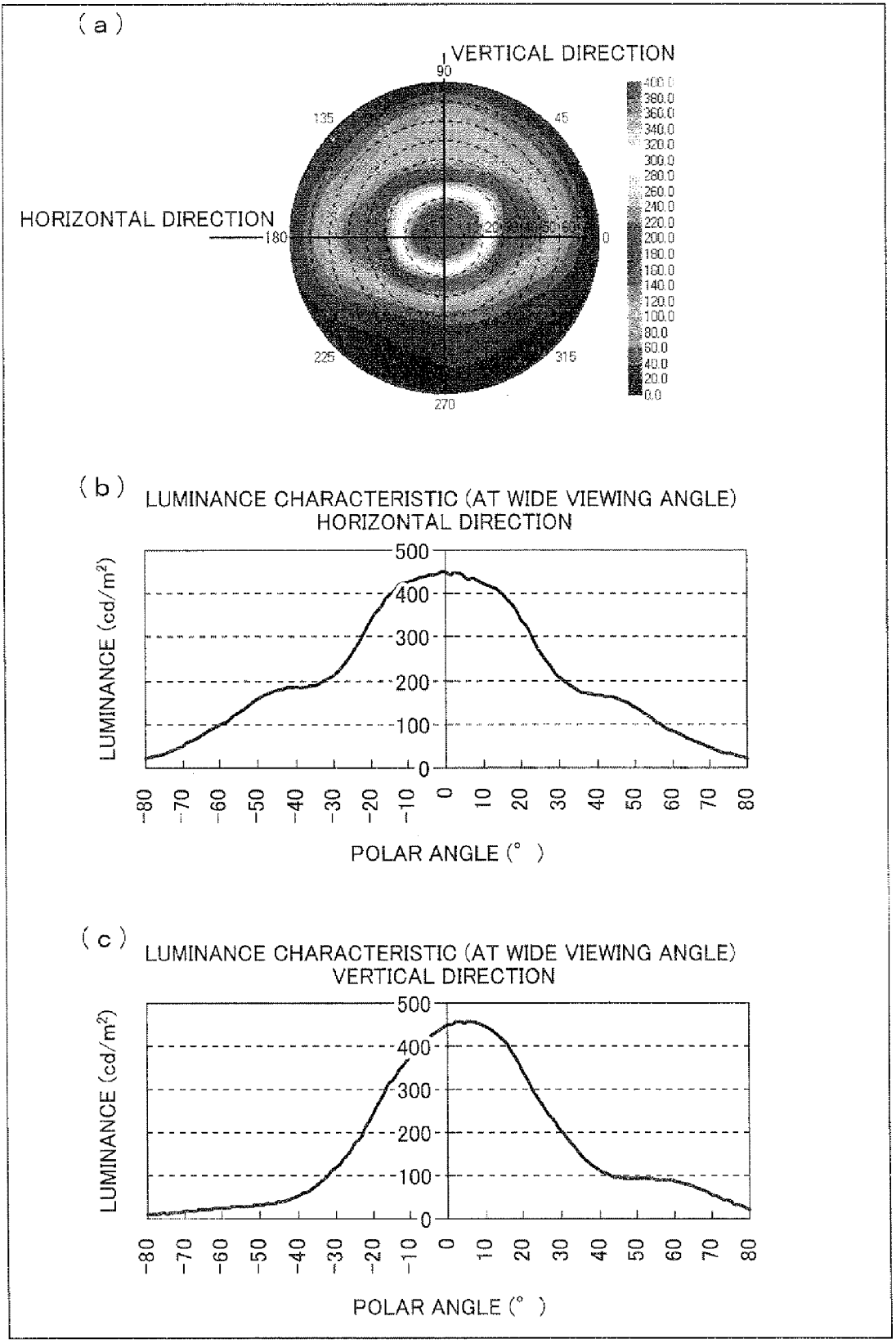

(a) of FIG. 15 which is a chart illustrating a luminance distribution in a wide viewing angle mode of the liquid crystal display in FIG. 14; (b) of FIG. 15 is a graph illustrating a luminance-polar angle characteristic in the horizontal direction with regard to (a) of FIG. 15; and (c) of FIG. 15 is a graph illustrating a luminance-polar angle characteristic in the vertical direction with regard to (a) of FIG. 15.

Figure 16:
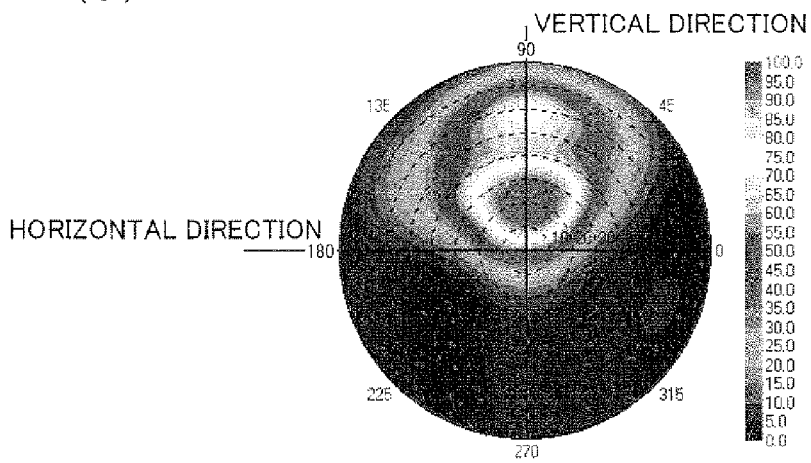
Figure 16:
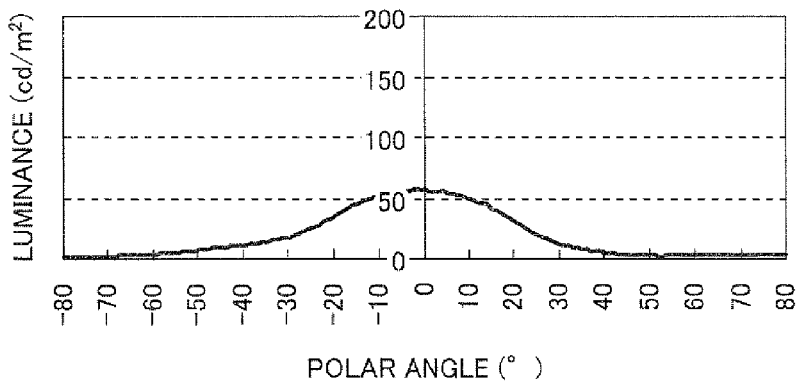
Figure 16:
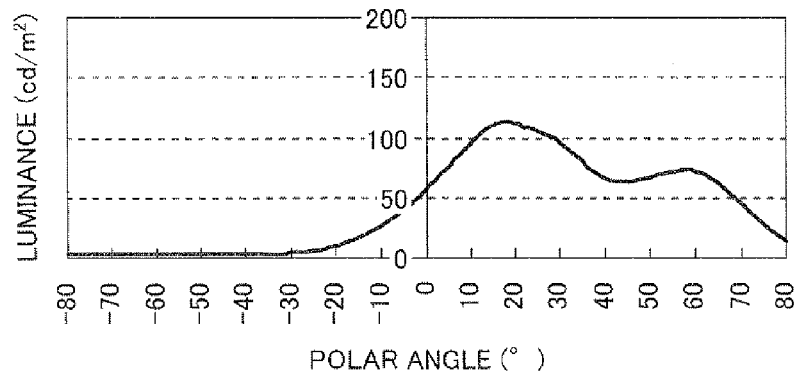

(a) of FIG. 16 is a chart illustrating a luminance distribution in a narrow viewing angle mode of the liquid crystal display in FIG. 14; (b) of FIG. 16 is a graph illustrating a luminance-polar angle characteristic in the horizontal direction with regard to (a) of FIG. 16; and (c) of FIG. 16 is a graph illustrating a luminance-polar angle characteristic in the vertical direction with regard to (a) of FIG. 16.

Figure 17:
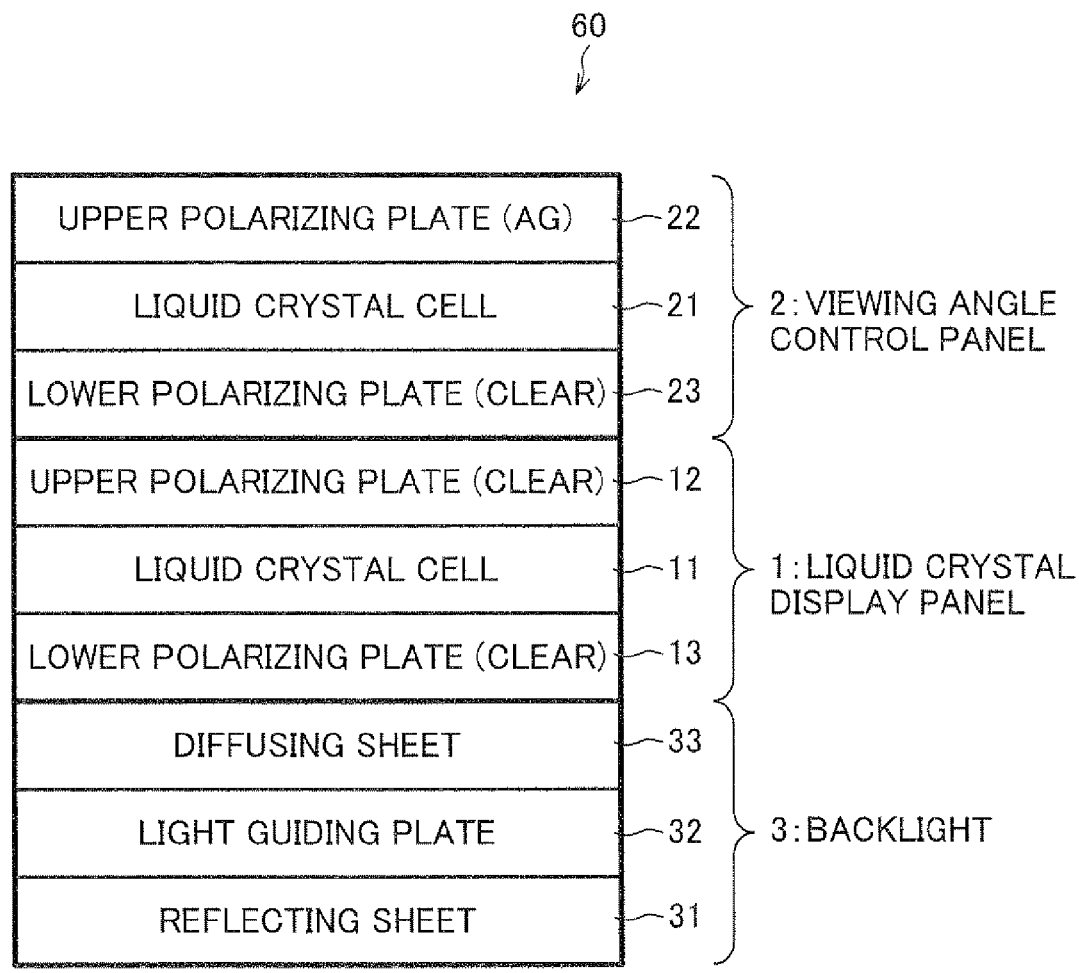

FIG. 17 is a sectional view of a liquid crystal display in which both of the polarizing plates provided between the viewing angle control panel and the liquid crystal display panel are clear polarizing plates, and no lens sheet is provided, in accordance with another embodiment.

Figure 18:
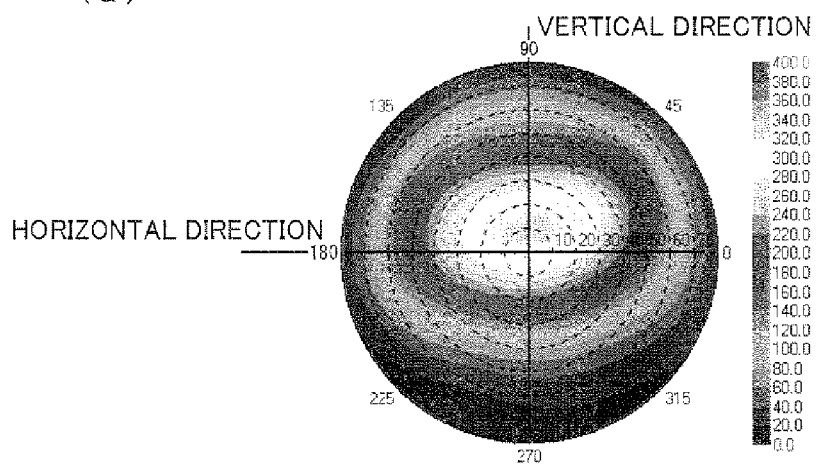
Figure 18:
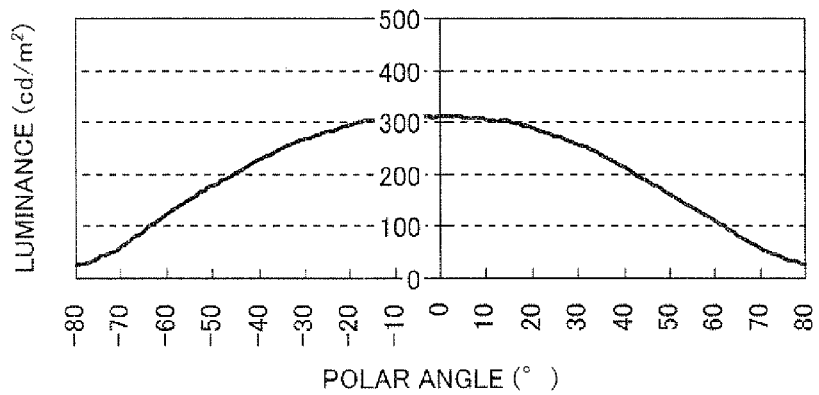
Figure 18:
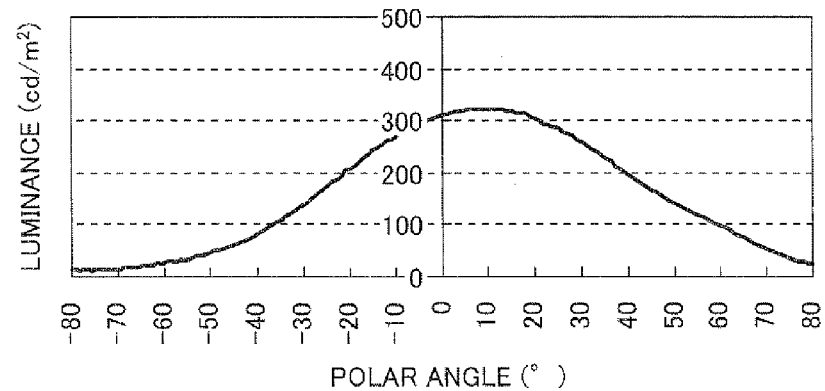

(a) of FIG. 18 which is a chart illustrating a luminance distribution in a wide viewing angle mode of the liquid crystal display in FIG. 17; (b) of FIG. 18 is a graph illustrating a luminance-polar angle characteristic in the horizontal direction with regard to (a) of FIG. 18; and (c) of FIG. 18 is a graph illustrating a luminance-polar angle characteristic in the vertical direction with regard to (a) of FIG. 18.

Figure 19:
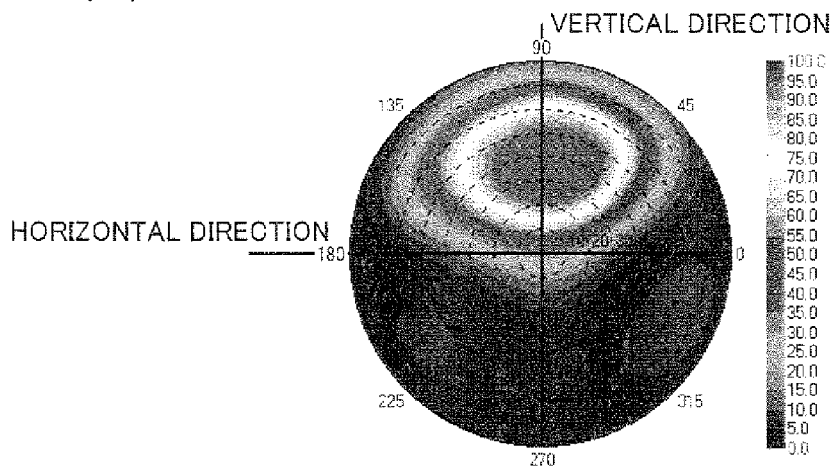
Figure 19:
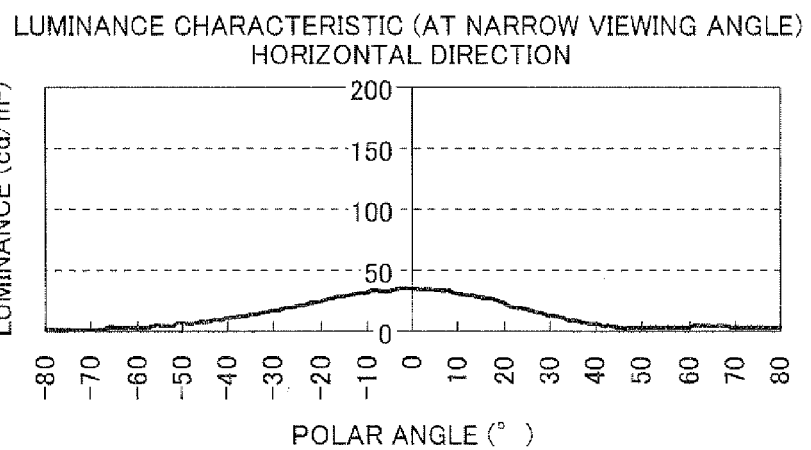
Figure 19:
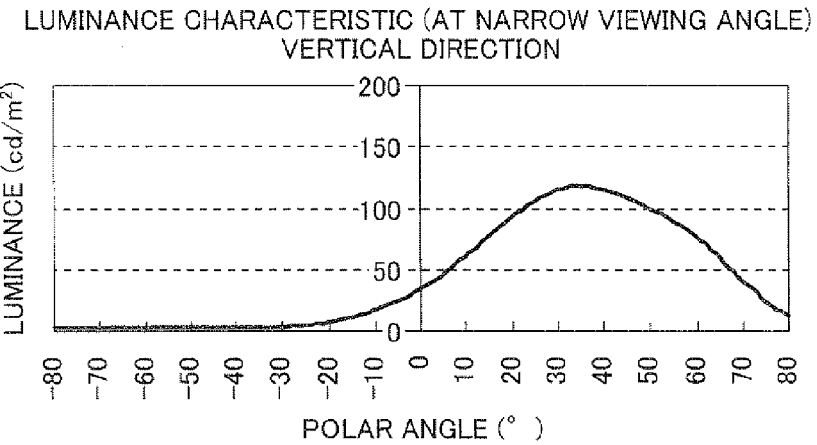

(a) of FIG. 19 which is a chart illustrating a luminance distribution in a narrow viewing angle mode of the liquid crystal display in FIG. 17; (b) of FIG. 19 is a graph illustrating a luminance-polar angle characteristic in the horizontal direction with regard to (a) of FIG. 19; and (c) of FIG. 19 is a graph illustrating a luminance-polar angle characteristic in the vertical direction with regard to (a) of FIG. 19.

Figure 20:
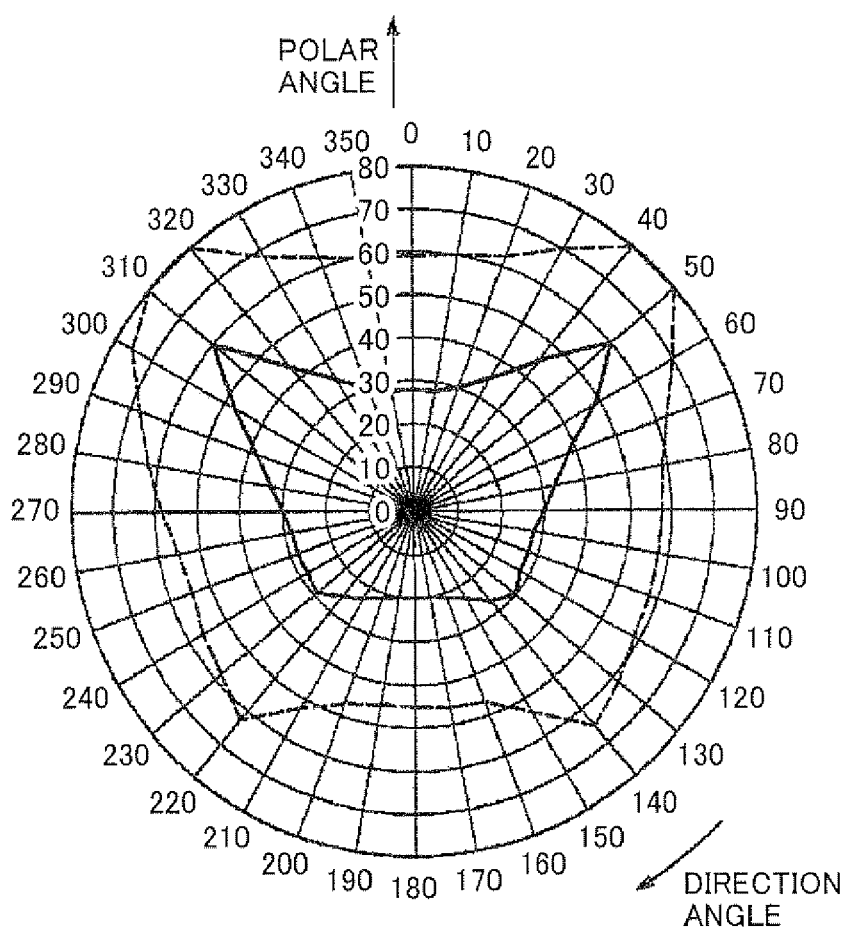

FIG. 20 is a chart illustrating a viewing angle distribution of a liquid crystal display which includes a conventional viewing angle control panel.

Figure 21:
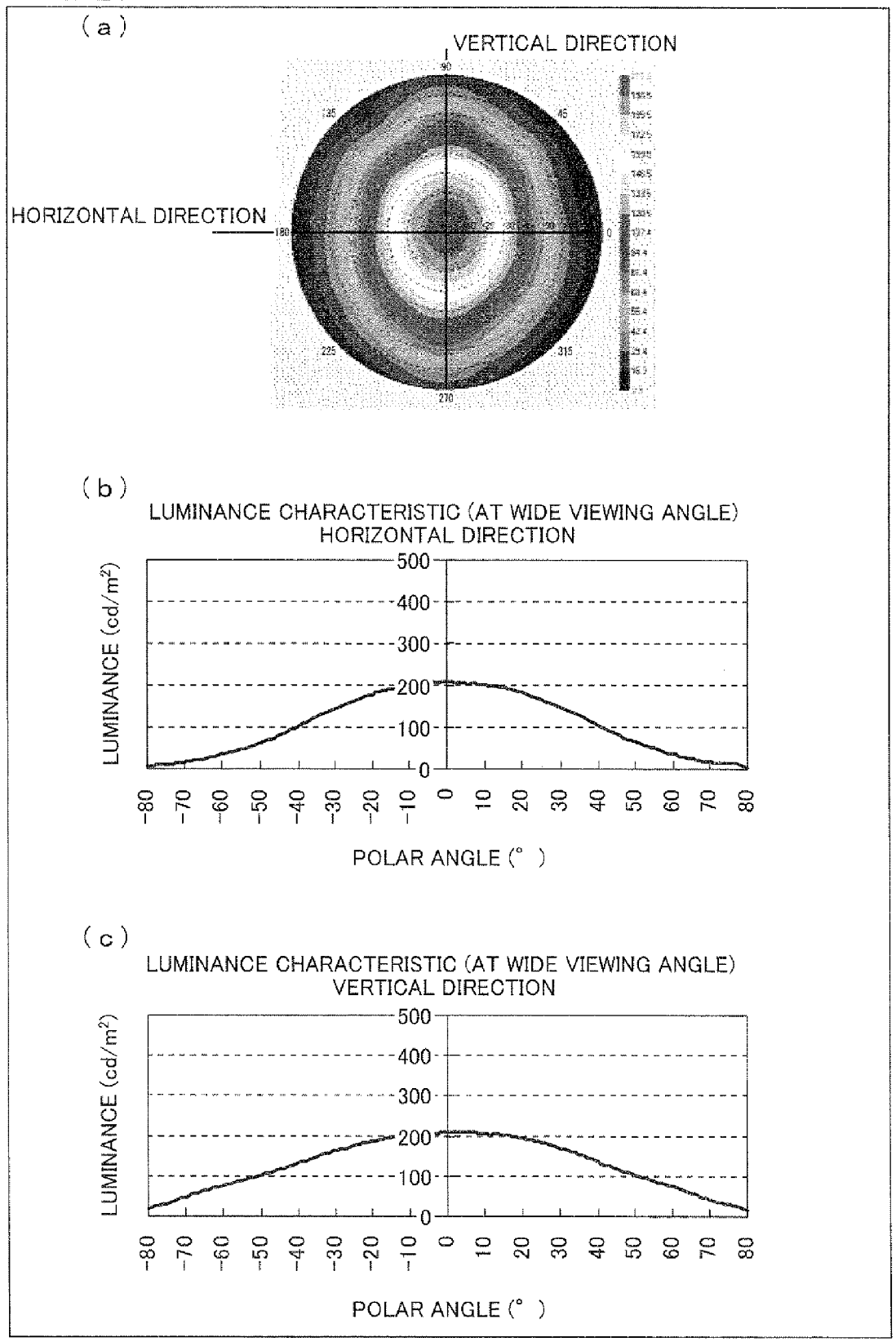

(a) of FIG. 21 which is a chart illustrating a luminance distribution in a wide viewing angle mode of another liquid crystal display which includes a conventional viewing angle control panel; (b) of FIG. 21 is a graph illustrating a luminance-polar angle characteristic in the horizontal direction with regard to (a) of FIG. 21; and (c) of FIG. 21 is a graph illustrating a luminance-polar angle characteristic in the vertical direction with regard to (a) of FIG. 21.

Figure 22:
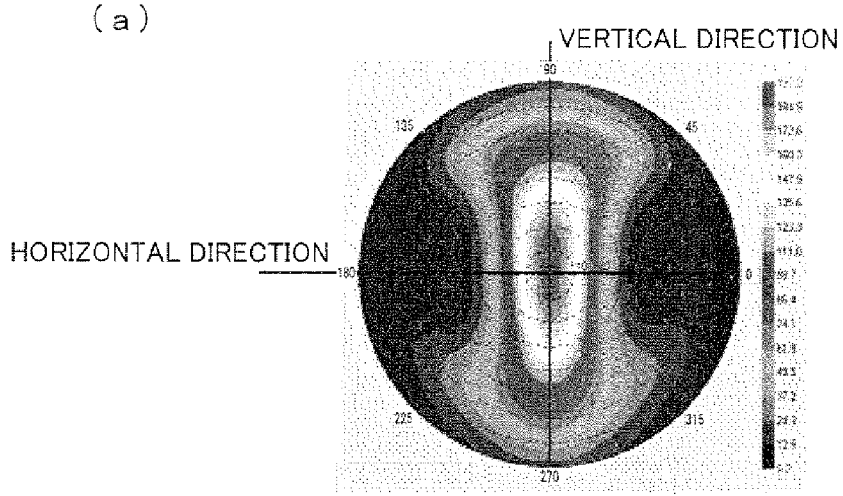
Figure 22:
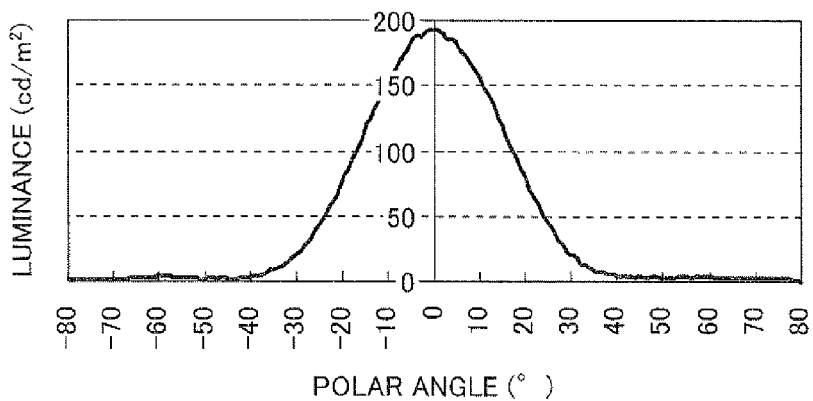
Figure 22:
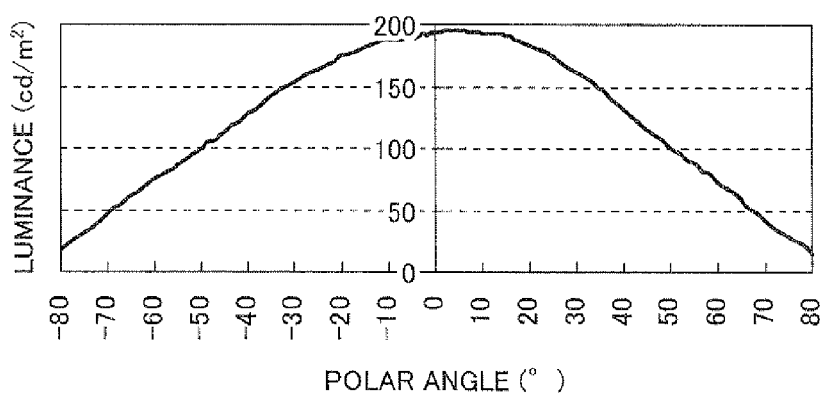

(a) of FIG. 22 which is a chart illustrating a luminance distribution in a narrow viewing angle mode of the liquid crystal display which includes the conventional viewing angle control panel; (b) of FIG. 22 is a graph illustrating a luminance-polar angle characteristic in the horizontal direction with regard to (a) of FIG. 22; and (c) of FIG. 22 is a graph illustrating a luminance-polar angle characteristic in the vertical direction with regard to (a) of FIG. 22.

DESCRIPTION OF THE NUMBERED CODES 1 liquid crystal display panel (display panel)
2 viewing angle control panel
3 backlight
10 liquid crystal display (display device)
10a liquid crystal display (display device)
10b liquid crystal display (display device)
11 liquid crystal cell
12 upper polarizing plate for the liquid crystal panel (polarizing plate)
13 lower polarizing plate for the liquid crystal panel
21 liquid crystal cell
21a light-transmitting substrate
21b light-transmitting substrate
21c liquid crystal molecule
22 upper polarizing plate for the control panel
23 lower polarizing plate for the control panel (polarizing plate)
50 liquid crystal display (display device)
50a liquid crystal display (display device)
60 liquid crystal display (display device)
$X_{22}$ polarizing transmission axis
$X_{23}$ polarizing transmission axis

DETAILED DESCRIPTION

Embodiment 1

One embodiment of the present technology is described below with reference to FIGS. 1 through 12. For convenience of explanation, the drawings which are referred to in the following description only show, in a simplified manner, main members which are needed for explanation of the present embodiment, among the constituent members of one embodiment. As such, a liquid crystal display of the present embodiment may include any constituent member which is not shown in the drawings that are referred to in the present specification. In addition, the sizes of members in the figures do not accurately show the sizes of the actual constituent members, the size proportion of such members, or the like.

Figure 1:
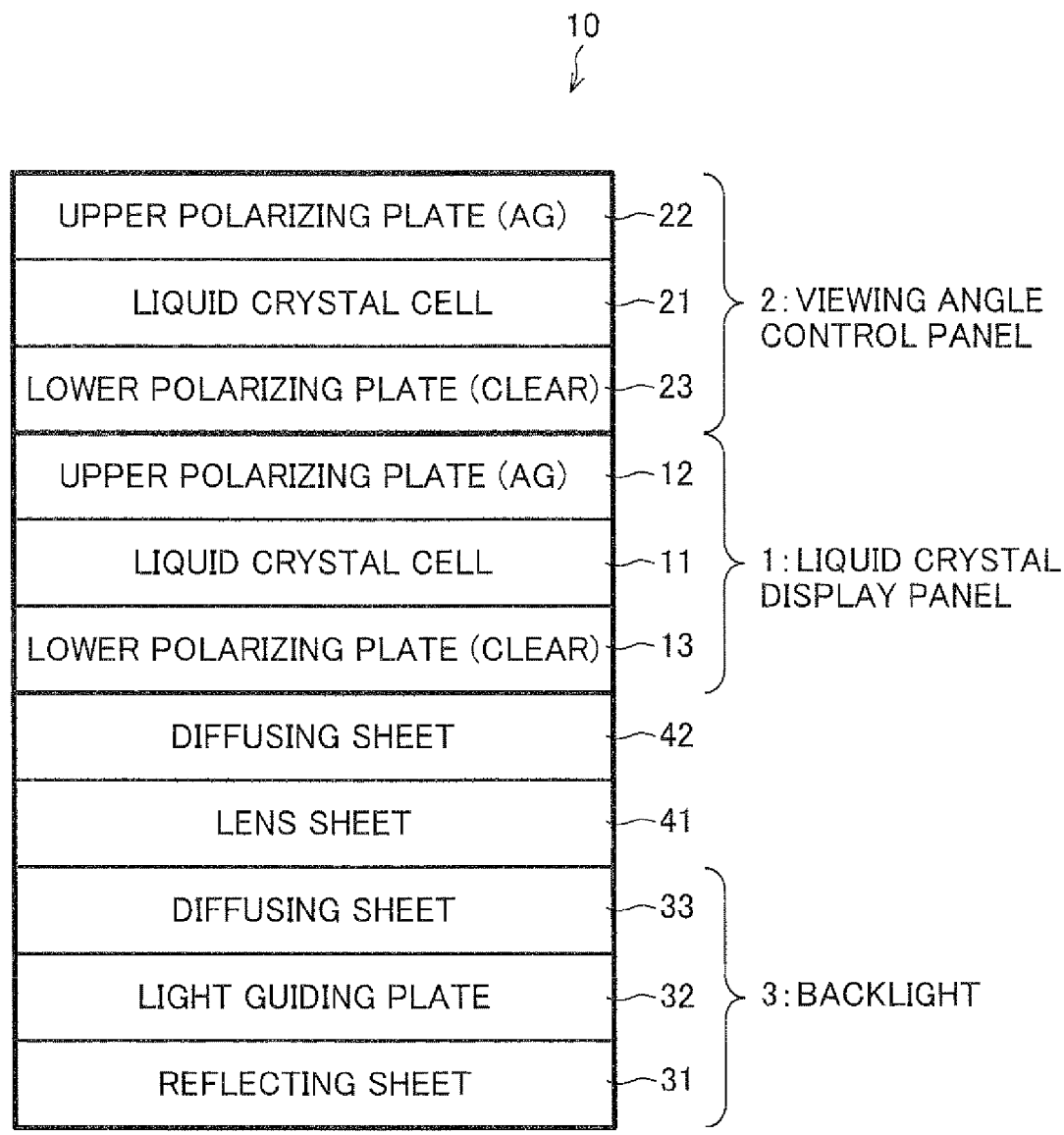
FIG. 1 is a sectional view of a structure of a liquid crystal display which includes a viewing angle control panel, in accordance with an embodiment.

The following description deals with an arrangement of a liquid crystal display 10 of the present embodiment, with reference to FIG. 1. FIG. 1 is a sectional view schematically illustrating an arrangement of the liquid crystal display 10.

As shown in FIG. 1, the liquid crystal display 10 includes two panels: a liquid crystal display panel 1 serving as a display panel for displaying an image; and a viewing angle control panel 2 provided on the liquid crystal display panel 1. The liquid crystal display panel 1 is of a transmissive type. A backlight 3 is used as a light source. In the present embodiment, a lens sheet 41 and a diffusing sheet 42 are layered between the backlight 3 and the viewing angle control panel 2.

The liquid crystal display panel 1 includes: a liquid crystal cell 11; an upper polarizing plate 12 for the liquid crystal panel; and a lower polarizing plate 13 for the liquid crystal panel. The liquid crystal cell includes a pair of light-transmitting substrates and a liquid crystal which is sandwiched by the light-transmitting substrates. The upper polarizing plate 12 for the liquid crystal panel and the lower polarizing plate 13 for the liquid crystal panel are provided on the top surface and on the bottom surface of the liquid crystal cell 11, respectively. The upper polarizing plate 12 for the liquid crystal panel has a surface which has been subjected to a diffusion treatment such as an anti-glare (AG) treatment. The AG treatment refers to a treatment for prevention of glare (reflection), and is one of methods for preventing, for example, specular reflection on a surface such as a glass surface. The AG treatment may be realized, for example, by roughening the surface of the upper polarizing plate 12 for the liquid crystal panel to a small degree or by attaching a rough-surfaced film to the surface of the upper polarizing plate 12. This can avoid, for example, that a background is displayed.

The lower polarizing plate 13 for the liquid crystal panel is made up of a polarizing plate which has not been subjected to a surface treatment, i.e., it is a so-called clear polarizing plate.

Any liquid crystal and any cell structure can be used as the liquid crystal cell 11 of the liquid crystal display panel 1. In addition, any driving method can be applied to the liquid crystal display panel 1. In other words, any liquid crystal panel which is capable of displaying characters, still images, or moving images can be used as the liquid crystal display panel 1. In addition, the liquid crystal display panel 1 may be capable of carrying out a color display, or exclusively carry out a monochrome display. As such, FIG. 1 does not show a specific structure of the liquid crystal display panel 1, and a description of the liquid crystal display panel 1 is omitted.

The backlight 3 includes a reflecting sheet 31, a light guiding plate 32, and a diffusing sheet 33, in this order from the bottom. A light source (not shown) is provided on a side of the light guiding plate 32. The backlight 3 has a normal structure. Therefore, any publicly known backlight may be used.

Figure 2:
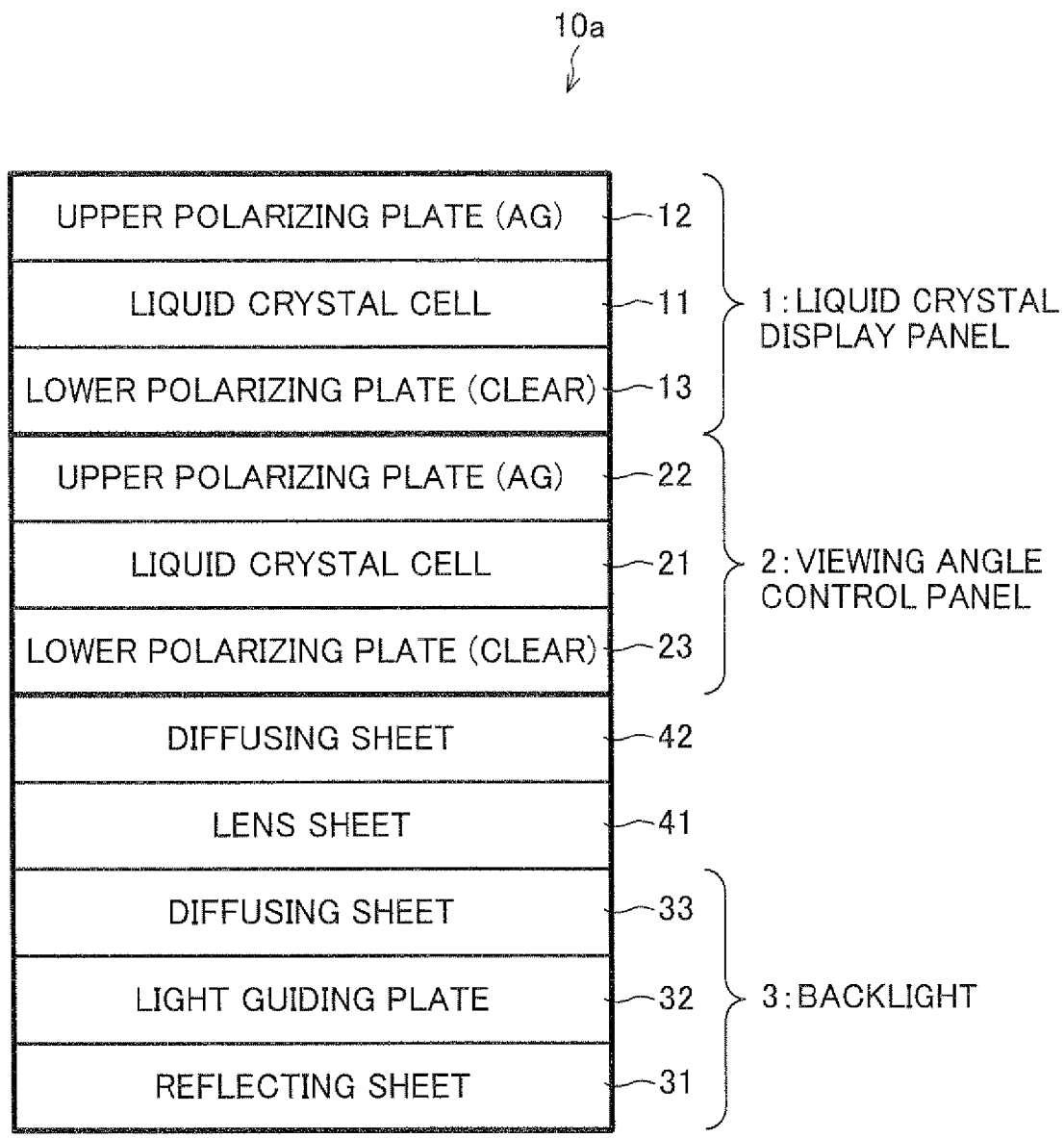
FIG. 2 is a sectional view of a structure of a liquid crystal display, i.e., a modification of the above liquid crystal display, including a viewing angle control panel provided on a liquid crystal display panel.

The viewing angle control panel 2 is, for example, provided below the liquid crystal display panel 1, as shown in FIG. 1. However, the arrangement is not necessarily limited to this. For example, the viewing angle control panel 2 may be provided above the liquid crystal display panel 1 as shown in FIG. 2 so that a liquid crystal display 10a is formed.

The liquid crystal display 10 of the present embodiment is arranged such that switching of the liquid crystal in the viewing angle control panel 2 allows switching between two display modes, i.e., (i) a wide viewing angle state in which the viewing angle, at which a display of the liquid crystal display panel 1 is visible, is wide, and (ii) a narrow viewing angle state in which the viewing angle, at which a display of the liquid crystal display panel 1 is visible, is narrow. The narrow viewing angle mode is particularly suitable for a case where it is undesirable to let other people see a display on the liquid crystal display panel 1. The wide viewing angle mode is particularly suitable for a case, other than the case, such as normal use case or a case where two or more people simultaneously look at a display on the liquid crystal display panel 1.

As shown in FIG. 1, the viewing angle control panel 2 includes: a liquid crystal cell 21; an upper polarizing plate 22 for the control panel; and a lower polarizing plate 23 for the control panel. The liquid crystal cell 21 includes a pair of light-transmitting substrates 21a and 21b (described below) and a liquid crystal layer which is sandwiched by the light-transmitting substrates 21a and 21b. The upper polarizing plate 22 for the control panel is provided on a side of the liquid crystal display panel 1 of the liquid crystal cell 21. The lower polarizing plate 23 for the control panel is provided on a side of the liquid crystal display panel 1 of the liquid crystal cell 21. The liquid crystal layer is realized by a vertically aligned (homeotropically aligned) nematic liquid crystal.

The upper polarizing plate 22 for the control panel has a surface which has been subjected to a diffusion treatment such as the AG treatment. The lower polarizing plate 23 for the control panel is made up of a polarizing plate, which has not been subjected to a surface treatment, i.e., a clear polarizing plate. The lower polarizing plate 23 for the control panel is not necessarily required and therefore may be omitted. Specifically, at least one polarizing plate is only required to be provided between the viewing angle control panel 2 and the liquid crystal display panel 1. As such, the upper polarizing plate 12 for the liquid crystal panel may be used as a substitute for the lower polarizing plate 23 for the control panel.

The following explains in detail the structure and operation of the viewing angle control panel 2, with reference to (a) and (b) of FIG. 3. (a) and (b) of FIG. 3 are schematic views primarily illustrating the structure of the viewing angle control panel 2. (a) of FIG. 3 shows how liquid crystal molecules align in the narrow viewing angle mode. (b) of FIG. 3 shows how the liquid crystal molecules align in the wide viewing angle mode.

As shown in (a) and (b) of FIG. 3, the liquid crystal cell 21 of the viewing angle control panel 2 includes a pair of light-transmitting substrates 21a and 21b. Each surface of the light-transmitting substrates 21a and 21b has a transparent electrode (not shown) made, for example, of indium tin oxide (ITO). On the one hand, the liquid crystal display panel 1 includes an electrode structure which corresponds to a unit of display because it is required to drive the liquid crystal for such a unit of display, e.g., for each pixel or for each segment. On the other hand, the electrode structure of the viewing angle control panel 2 is not limited to a specific one. For example, a transparent electrode may be provided uniformly on each entire surface of the light-transmitting substrates 21a and 21b so that switching is carried out uniformly over the entire display surface. Instead, any other electrode structure may be adopted.

An alignment film (not shown) for causing liquid crystal molecules 21c to align is provided on each of the transparent electrodes. The alignment film has been subjected to a rubbing treatment based on a publicly known method. The rubbing directions for the alignment films of the light-transmitting substrates 21a and 21b are indicated by arrows Ra and Rb, respectively, in (a) and (b) of FIG. 3. As shown in (a) and (b) of FIG. 3, the rubbing direction Ra for the alignment film of the light-transmitting substrate 21a is parallel and reverse to the rubbing direction Rb for the alignment film of the light-transmitting substrate 21b.

In other words, the liquid crystal cell 21 of the viewing angle control panel 2 is of a so-called parallel type in which the twist angle is 0 degree (no twist is provided). According to the present embodiment, the liquid crystal which is injected into the liquid crystal cell 21 is a negative nematic liquid crystal having a negative dielectric anisotropy. As such, when no voltage is applied to the liquid crystal, the liquid crystal molecules 21c of the liquid crystal cell 21 are aligned so that the molecular long axes lie vertically to the surfaces of the light-transmitting substrates 21a and 21b. The liquid crystal layer of the liquid crystal cell 21 has a retardation d·Δn in a range from 200 nm to 350 nm, for example.

When a voltage is applied across the electrodes (not shown) provided on the light-transmitting substrates 21a and 21b, the liquid crystal molecules 21c, which lie vertically to the surfaces of the substrates, gradually change their alignment directions, in accordance with the intensity of the voltage applied, in a plane parallel to normals of the light-transmitting substrates 21a and 21b and parallel to the rubbing directions Ra and Rb with respect to the alignment film of the light-transmitting substrate 21a (see (a) of FIG. 3). When the voltage applied reaches a predetermined voltage, the liquid crystal molecules 21c are aligned so that the molecular long axes are parallel to the surfaces of the light-transmitting substrates 21a and 21b (see (b) of FIG. 3). (a) of FIG. 3 shows a state in which a voltage $V_L$ (e.g., a voltage of 2.5 V to 3.5 V) has caused the molecular long axes of the liquid crystal molecules 21c to be slanted with respect to the normals of the light-transmitting substrates 21a and 21b. (b) of FIG. 3 shows a state in which a voltage $V_H$ (e.g., a voltage of 5.0 V or greater) has caused the molecular long axes of the liquid crystal molecules 21c to lie substantially parallel to the surfaces of the light-transmitting substrates 21a and 21b.

As shown in (a) of FIG. 3, in the viewing angle control panel 2, the lower polarizing plate 23 for the control panel which is provided below the liquid crystal cell 21 and the upper polarizing plate 22 for the control panel are provided so that the respective polarizing transmission axes $X_{22}$ and $X_{23}$ cross each other substantially at right angle.

When an angle formed by the polarizing transmission axes $X_{22}$ and $X_{23}$ falls in the range from 80° to 100°, a sufficient effect obtained by switching a viewing angle is ensured. The polarizing transmission axis $X_{22}$ of the upper polarizing plate 22 for the control panel is at an angle in the range from 40° C. to 50° C. (preferably an angle of 45° C.) with respect to the rubbing direction R for the alignment film of the light-transmitting substrate 21a.

With reference to (a) and (b) of FIGS. 3, 4, and FIG. 5, the following description deals with how the viewing angle is switched between the wide viewing angle and the narrow viewing angle with use of the viewing angle control panel 2 having the above arrangement. In the viewing angle control panel 2, the viewing angle is switched between the wide viewing angle mode and the narrow viewing angle mode, by switching a voltage applied to the liquid crystal cell 21. In the following description, the viewing angle from a point of view with respect to the viewing angle control panel 2 is indicated by a direction angle θ and a polar angle Φ on the basis of the center of the upper polarizing plate 22 for the control panel.

FIG. 4 shows the viewing angles from three points of view $P_1$ through $P_3$ with respect to the viewing angle control panel 2 which is provided in the same direction as those in (a) and (b) of FIG. 3.

As shown in FIG. 4, the direction angle θ refers to an angle of rotation of a line which connects (i) an intersecting point of a perpendicular line perpendicularly drawn from a point of view and a plane which includes the surface of the upper polarizing plate 22 for the control panel and (ii) the center 22c of the upper polarizing plate 22 for the control panel. In the example shown in FIG. 4, it is assumed that the direction angle θ from the point of view $P_1$ is 0°, and that the direction angle θ increases clockwise when viewed from the upper side in the normal direction of the upper polarizing plate 22 for the control panel.

According to the example shown in FIG. 4, the point of view $P_2$ has a direction angle $θ_2$ of 90°, and the point of view $P_3$ has a direction angle $θ_3$ of 180°. The polar angle Φ is an angle defined by (i) a line which connects the center 22c of the upper polarizing plate 22 for the control panel and a point of view and (ii) the normal of the upper polarizing plate 22 for the control panel.

With reference to (a) through (c) of FIG. 5, the following description deals with displaying states, which are viewed from the points of view $P_1$ through $P_3$ shown in FIG. 4, respectively, obtained in the case where, as shown in (a) of FIG. 3, the voltage $V_L$ applied to the liquid crystal cell 21 has caused the molecular long axes of the liquid crystal molecules 21c to be slightly slanted with respect to the normals of the light-transmitting substrates 21a and 21b.

With regard to the viewing angle from the point of view $P_1$ in FIG. 4 (direction angle $θ_1=0°$), the short axis of the liquid crystal molecule 21c faces the point of view $P_1$ in the viewing angle direction (see (a) of FIG. 5). In consequence of this, with regard to the viewing angle from the point of view $P_1$, linearly polarized light, generated from light which has been emitted from the backlight 3, passed through the lower polarizing plate 23 for the control panel, and been entered into the liquid crystal cell 21, is blocked by the upper polarizing plate 22 for the control panel, because the linearly polarized light is not subjected to birefringence caused by the liquid crystal molecules 21c. This causes a black display to be carried out with regard to the viewing angle from the point of view $P_1$ (direction angle $θ_1=0°$). When the voltage $V_L$ applied to the liquid crystal cell 21 is in the range from 2.5 V to 3.5 V as described above, it is possible to obtain a blocking state in which it is possible to sufficiently prevent a display from being seen by other people for a polar angle Φ, as shown in FIG. 5, falling in the range of 30°≦Φ<90° with regard to the direction angle $θ_1=0°$. In FIG. 6, $L_1$ to $L_8$ are coordinate lines indicative of viewing angle distributions for luminances of 50 cd/m², 100 cd/m², 150 cd/m², 200 cd/m², 250 cd/m², 300 cd/m², 350 cd/m², and 400 cd/m², respectively. FIG. 6 is a view illustrating a luminance distribution obtained in a case where the lens sheet 41, or first lens sheet 41a and the second lens sheet 41b are not provided.

With regard to the viewing angle from the point of view $P_2$ in FIG. 4 (direction angle $θ_2=90°$), the long axis of the liquid crystal molecule 21c is slightly slanted with respect to each of the polarizing transmission axis $X_{22}$ of the upper polarizing plate 22 for the control panel and the polarizing transmission axis $X_{23}$ of the lower polarizing plate 23 for the control panel (see (b) of FIG. 5)).

In consequence of this, with regard to the angle from the point of view $P_2$, a linearly polarized light, generated from light which has been emitted from the backlight 3, passed through the lower polarizing plate 23 for the control panel, and been entered into the liquid crystal cell 21, is blocked by the upper polarizing plate 22 for the control panel, although the linearly polarized light is subjected to a very small birefringence caused by the liquid crystal molecules 21c. This also causes a black display to be carried out with regard to the viewing angle from the point of view $P_2$ (direction angle $\theta_2=90°$).

Further, with regard to a point of view opposite to the point of view $P_2$, i.e., in a case of direction angle θ of 270°, a black display is carried out because of the same principle as in the case of the point of view $P_2$. When the voltage $V_L$ applied to the liquid crystal cell 21 is in the range from 2.5 V to 3.5 V as described above, it is possible to obtain a blocking state in which it is possible to sufficiently prevent a display from being seen by other people for a polar angle Φ is, as shown in FIG. 6, falling in the range of 30°≦Φ<90° with regard to the direction angle θ=90° and the direction angle θ270°.

With regard to the viewing angle from the point of view $P_3$ in FIG. 4 (direction angle $\theta_3=180°$), (i) the molecular long axis of the liquid crystal molecule 21c is slanted approximately 45 degrees with respect to each of the polarizing transmission axis $X_{22}$ of the upper polarizing plate 22 for the control panel and the polarizing transmission axis $X_{23}$ of the lower polarizing plate 23 for the control panel and (ii) the long axis of the liquid crystal molecule 21c faces the point of view $P_3$ in the angle direction (see (c) of FIG. 5). In consequence, with regard to the viewing angle from the point of view $P_3$, linearly polarized light, generated from light which has been emitted from the backlight 3, passed through the lower polarizing plate 23 for the control panel, and been entered into the liquid crystal cell 21, is caused to rotate its polarization direction so that the polarization direction coincides with the polarizing transmission axis $X_{22}$ of the upper polarizing plate 22 for the control panel, because the linearly polarized light is subjected to birefringence caused by the liquid crystal molecules 21c. The linearly polarized light then passes through the upper polarizing plate 22 for the control panel. This causes a good display to be carried out with respect to the viewing angle from the point of view $P_3$. When the voltage $V_L$ is in the range from 2.5 V to 3.5 V as described above, it is possible to obtain a good display for a polar angle Φ falling in the range of 0°≦Φ<90° with regard to the direction angle $\theta_3=180°$ (see FIG. 6).

As described above, when the liquid crystal cell 21 of the viewing angle control panel 2 receives the voltage $V_L$ causing the molecular long axis of the liquid crystal molecule 21c to be slightly slanted with respect to the normals of the substrates, a good display is obtained only in a narrow viewing angle range in the vicinity of the direction angle θ of 180°. With regard to other direction angles, the polarized light in the liquid crystal cell 21 is blocked by the upper polarizing plate 22 for the control panel. This causes a black display to be carried out.

In other words, when applying the voltage $V_L$ to the liquid crystal cell 21 of the viewing angle control panel 2, it is possible to block the light emitted from the backlight 3 in the wide viewing angle direction. As a result, it is impossible to view an image displayed on the liquid crystal display panel 1 in the wide viewing angle direction. This allows the liquid crystal display 10 to have a narrow viewing angle.

As shown in (b) of FIG. 3, when the liquid crystal cell 21 of the viewing angle control panel 2 receives the voltage $V_H$ causing the molecular long axis of the liquid crystal molecule 21c to be slanted so as to be substantially parallel to the substrates, it is possible for the liquid crystal display 10 to have a wide viewing angle with respect to any of the viewing angle from the points of view $P_1$ through $P_3$ shown in FIG. 4. This is because birefringence occurs so sufficiently that a good display can be carried out with regard to any direction angle θ, as shown in FIG. 7. In FIG. 7, $L_1$ through $L_8$ are coordinate lines indicative of viewing angle distributions for luminances of 130 cd/m², 240 cd/m², 350 cd/m², 460 cd/m², 570 cd/m², 680 cd/m², 790 cd/m², and 900 cd/m², respectively. FIG. 7 is a view illustrating a luminance distribution obtained in a case where the lens sheet 41, or first lens sheet 41a and the second lens sheet 41b are not provided.

According to the liquid crystal display 10 of the present embodiment, it is possible to switch the display states of the liquid crystal display 10 between the wide viewing angle mode and the narrow viewing angle mode, by switching the voltages applied to the liquid crystal cell 21 of the viewing angle control panel 2 between at least two voltages, i.e., the voltage $V_L$ and the voltage $V_H$.

As shown in FIG. 8, the viewing angle control panel 2 may also be arranged so as to further include a retardation film 4 between the upper polarizing plate 22 for the control panel and the light-transmitting substrate 21a of the liquid crystal cell 21. In a case where the voltage $V_L$ is applied to the liquid crystal cell 21 so that the liquid crystal display 10 has a narrow viewing angle, when viewed from a viewing angle other than the direction angle θ in the vicinity of 180° shown in FIG. 4 (e.g., with regard to direction angles θ in the order of 0°, 90°, and 270°, respectively), linearly polarized light, generated from light which has been emitted from the backlight 3 and passed through the lower polarizing plate 23 for the control panel, becomes elliptically polarized light. This is because birefringence is caused in the liquid crystal layer of the liquid crystal cell 21 due to the refractive index ($n_e$, $n_o$) of the liquid crystal molecules 21c.

This causes a leakage of light because the light partially passes through the upper polarizing plate 22 for the control panel. The retardation film 4 is provided so as to optically compensate the elliptically polarized light. Specifically, a retardation film is used as the retardation film 4 causing an occurrence of elliptically polarized light that cancels out the elliptically polarized light generated in the liquid crystal layer of the liquid crystal cell 21 in the narrow viewing angle mode. Three-dimensional refractive index axes $N_X$, $N_Y$ and $N_Z$ of the retardation film 4 are defined as in FIG. 7. Specifically, a three-dimensional refractive index axis $N_X$ is a component perpendicular to the polarizing transmission axis $X_{22}$ of the upper polarizing plate 22 for the control panel; the three-dimensional refractive index axis $N_Y$ is a component parallel to the polarizing transmission axis $X_{22}$ of the upper polarizing plate 22 for the control panel; and the three-dimensional refractive index axis $N_Z$ is a component parallel to the normal of the upper polarizing plate 22 for the control panel.

According to the arrangement described above, an insufficient narrow viewing angle characteristic is obtained in the narrow viewing angle mode of the viewing angle control panel 2.

In view of this, the liquid crystal display of the present embodiment includes the lens sheet 41 between the backlight 3 and the viewing angle control panel 2, as shown in FIG. 1. Light from the backlight 3 is condensed by the lens sheet 41, so that the narrow viewing angle characteristic is enhanced in the narrow viewing angle mode. The lens sheet 41 has, for example, a vertically-stripped prism ridgeline pattern. A diffusing sheet 42 is further provided on the lens sheet 41.

Note that the narrow viewing angle characteristic is more enhanced when the lens sheet 41 is made up of multiple layers than when the lens sheet 41 is made up of a single layer. When the lens sheet 41 is made up of, for example, two layers, as shown in FIGS. 9 (a) and 9 (b), it is preferable that the lens sheet 41 is made up of two layers, i.e., (i) a first lens sheet 41a which is provided on a side of the backlight 3 and has a prism ridgeline pattern which is vertically stripped with respect to the liquid crystal display panel 1 and (ii) a second lens sheet 41b which is provided on the first lens sheet 41a and has a prism ridgeline pattern which is horizontally stripped with respect to the liquid crystal display panel 1.

With reference to (a) through (d) of FIG. 10, and (a) and (b) of FIG. 11, the following description deals with how the viewing angle characteristic of the liquid crystal display 10 is enhanced when the lens sheet 41 is made up of the first lens sheet 41a and the second lens sheet 41b. (a) of FIG. 10 is a chart illustrating a luminance distribution of a general liquid crystal display in which no lens sheet 41 is included. (b) of FIG. 10 is a chart illustrating a luminance distribution of a general liquid crystal display in which a first lens sheet 41a is included. (c) of FIG. 10 is a chart illustrating a luminance distribution of a general liquid crystal display in which a second lens sheet 41b is included. (d) of FIG. 10 is a chart illustrating a luminance distribution of a general liquid crystal display in which a first lens sheet 41a and a second lens sheet 41b are stacked. (a) of FIG. 11 is a graph illustrating luminance-polar angle characteristics in the horizontal direction with regard to (a) through (d) of FIG. 10. (b) of Fig. (b) is a graph illustrating luminance-polar angle characteristics in the vertical direction with regard to (a) through (d) of FIG. 10.

As is clear from Figs. (a) and (b) of FIG. 10, and (a) and (b) of FIG. 11, when the first lens sheet 41a having a prism ridgeline pattern which is vertically stripped with respect to the liquid crystal display panel 1 is solely inserted, the polar angle is narrowed in the horizontal direction. In contrast, as is clear from (a) through (c) of FIG. 10, (a) and (b) of FIG. 11, when the second lens sheet 41b having a prism ridgeline pattern which is horizontally stripped with respect to the liquid crystal display panel 1 is solely inserted, the polar angle is narrowed in the vertical direction. Further, as is clear from (a) and (b) of FIG. 10, and (a) and (b) of FIG. 11, when the first lens sheet 41a having a prism ridgeline pattern which is vertically stripped with respect to the liquid crystal display panel 1 and the second lens sheet 41b having a prism ridgeline pattern which is horizontally stripped with respect to the liquid crystal display panel 1 are both inserted, the polar angle is narrowed both in the horizontal direction and in the vertical direction.

As is clear from the above, the insertion of a lens sheet 41 causes enhancement of the narrow viewing angle characteristic, and the insertion of a first lens sheet 41a and a second lens sheet 41b causes further enhancement of the narrow viewing angle characteristic.

FIG. 12 shows luminance distributions obtained, in the narrow viewing angle mode, when the first lens sheet 41a and the second lens sheet 41b are stacked in the liquid crystal display 10 of the present embodiment.

When the luminance distributions shown in FIG. 12 are compared with those in FIG. 6, it is confirmed that the narrow viewing angle characteristic is enhanced in the narrow viewing angle mode.

As described above, a liquid crystal display 10 of the present embodiment includes either a lens sheet 41 or a first lens sheet 41a and a second lens sheet 41b, between a backlight 3 and a liquid crystal display panel 1 or a viewing angle control panel 2. Since either the lens sheet 41 or the first lens sheet 41a and the second lens sheet 41b causes light emitted from the backlight 3 to be condensed, it is possible to realize a narrow viewing angle. This allows provision of liquid crystal displays 10 and 10a which are capable of enhancing a narrow viewing angle characteristic.

According to a liquid crystal display 10b of the present embodiment, it is preferable that a lens sheet is made up of a plurality of layered lens sheets. As such, it is possible that the light emitted from the backlight 3 is more condensed when a lens sheet is made up of layered multiple lens sheets, as compared with a case where a lens sheet is made up of a single lens sheet.

According to the liquid crystal display 10b of the present embodiment, the lens sheet is made up of two (2) layers, i.e., (i) a first lens sheet 41a which is provided on a side of the backlight 3 and has a prism ridgeline pattern which is vertically stripped with respect to the liquid crystal display panel 1 and (ii) a second lens sheet 41b which is provided on the first lens sheet 41a and has a prism ridgeline pattern which is horizontally stripped with respect to the liquid crystal display panel 1. Note that "vertically stripped with respect to the liquid crystal display panel 1" is intended to mean "provided in a longitudinal direction with respect to a liquid crystal display panel 1 when the liquid crystal display panel 1 is viewed in a normal direction.

With the arrangement, the first lens sheet 41a, having a prism ridgeline pattern which is vertically stripped with respect to the liquid crystal display panel 1, allows condensing of light emitted from the backlight 3 so that the narrow viewing angle is realized in the horizontal direction. Further, the second lens sheet 41b having a prism ridgeline pattern which is horizontally stripped with respect to the liquid crystal display panel 1 allows condensing of light emitted from the backlight 3 so that the narrow viewing angle is realized in the vertical direction.

As a result, the narrow viewing angle can realized efficiently, both in the horizontal and vertical directions, with the use of the first lens sheet 41a and the second lens sheet 41b. It has been proven as results of experiments that a better blocking effect is achieved when, as shown in FIG. 9 (b), (i) the first lens sheet 41a having a prism ridgeline pattern which is vertically stripped with respect to the liquid crystal display panel 1 is provided on the side of the backlight 3 and (ii) the second lens sheet 41b having a prism ridgeline pattern which is horizontally stripped with respect to the liquid crystal display panel 1 is provided on the first lens sheet 41a than when the first lens sheet 41a and the second lens sheet 41b are provided in the reverse order.

Each of the liquid crystal displays 10, 10a and 10b of the present embodiment is arranged such that the viewing angle control panel 2 includes (i) a liquid crystal cell 21 which includes a pair of light-transmitting substrates 21a and 21b and a liquid crystal layer which is provided between the light-transmitting substrates, the liquid crystal layer having liquid crystal molecules aligned vertically, and (ii) a driving circuit for applying a voltage to the liquid crystal layer, that the liquid crystal cell 21 is provided between an upper polarizing plate 22 for the control panel and a lower polarizing plate 23 for the control panel which are disposed to face each other so that polarizing transmission axes $X_{22}$ and $X_{23}$ are substantially orthogonal to each other, and that the driving circuit changes an alignment of the liquid crystal molecules 21c of the liquid crystal layer in the liquid crystal cell 21 so that display modes are switched between a first viewing angle range and a second viewing angle range which is within the first viewing angle range and narrower than the first viewing angle range.

With the arrangement, the upper polarizing plate 22, which is provided on a viewer's side of the viewing angle control panel 2, serves as an analyzer. This allows light, emitted from the viewing angle control panel 2 toward a viewer, to be transmitted or blocked in accordance with the viewing angle.

As a result, it is possible to provide liquid crystal displays 10, 10a, and 10b capable of enhancing the effect of narrowing a viewing angle when a switching is carried out from a wide viewing angle mode to a narrow viewing angle mode.

Embodiment 2

Another embodiment of the present technology is described below with reference to FIGS. 13 through 16. Note that the arrangement that is not described in Embodiment 2 is the same as in Embodiment 1, and that, for convenience of explanation, same members in Embodiment 2 as those in Embodiment 1 are assigned the same reference numerals and the description of the members is omitted.

As shown in FIG. 13, a liquid crystal display 50 of the present embodiment is arranged such that, as contrasted to the liquid crystal display 10 of Embodiment 1, neither a upper polarizing plate 12 for the liquid crystal panel nor a lower polarizing plate 23 for the control panel has been subjected to a diffusion treatment (shown in FIG. 13 as "UPPER POLARIZING PLATE (CLEAR) 12" and "LOWER POLARIZING PLATE (CLEAR) 23", respectively). However, the present embodiment is not necessarily limited to this. For example, it may be arranged such that a single polarizing plate, which has not been subjected to a diffusion treatment, is provided between and shared by the liquid crystal cell 11 of the liquid crystal display panel 1 and the liquid crystal cell 21 of the viewing angle control panel 2.

FIG. 13 shows an arrangement in which the viewing angle control panel 2 is provided on an upper side of the liquid crystal display panel 1. However, the present embodiment is not necessarily limited to this. Specifically, it may be arranged such that the liquid crystal display panel 1 and the viewing angle control panel 2 are layered in the reverse order so that the liquid crystal display panel 1 is provided on an upper side of the viewing angle control panel 2.

According to the liquid crystal display 50 of the present embodiment, the upper polarizing plate 12 for the liquid crystal panel, as well as the lower polarizing plate 23 for the control panel, is a polarizing plate which has not been subjected to a diffusion treatment. This arrangement also enhances the effect of narrowing a viewing angle.

As shown in FIG. 14, the liquid crystal display 50 may be replaced with a liquid crystal display 50a in which a lens sheet 41 includes a first lens sheet 41a and a second lens sheet 41b.

The following description deals with performance of the liquid crystal display 50a, with reference to (a) through (c) of FIG. 15, and (a) through (c) of FIG. 16. (a) of FIG. 15 is a chart illustrating a luminance distribution in a wide viewing angle mode of the liquid crystal display 50a; (b) of FIG. 15 is a graph illustrating a luminance-polar angle characteristic in the horizontal direction in (a) of FIG. 15; and (c) of FIG. 15 is a graph illustrating a luminance-polar angle characteristic in the vertical direction in (a) of FIG. 15. Further, (a) of FIG. 16 is a chart illustrating a luminance distribution in a narrow viewing angle mode of the liquid crystal display 50a; (b) of FIG. 16 is a graph illustrating a luminance-polar angle characteristic in the horizontal direction in (a) of FIG. 16; and (c) of FIG. 16 is a graph illustrating a luminance-polar angle characteristic in the vertical direction in (a) of FIG. 16.

As is clear from (a) through (c) of FIG. 16, the viewing angle becomes narrower, as compared to the viewing angle shown by the luminance distributions in FIG. 12 of Embodiment 1. The effect of narrowing a viewing angle is also clear from a comparison of the luminance distribution in the wide viewing angle mode shown in (a) of FIG. 15 of the present embodiment and the luminance distribution in the wide viewing angle mode shown in FIG. 7 of Embodiment 1.

As described above, in each of the liquid crystal displays 50 and 50a of the present embodiment, the lower polarizing plate 23 for the control panel and the upper polarizing plate 12 for the liquid crystal panel, which have not been subjected to a diffusion treatment, are included between the liquid crystal cell 11 of the liquid crystal display panel 1 and the liquid crystal cell 21 of the viewing angle control panel 2.

With the arrangement, it is avoided that the effect of narrowing a viewing angle is blocked. This is because the lower polarizing plate 23 for the control panel and the upper polarizing plate 12 for the liquid crystal panel, which have not been subjected to a diffusion treatment, between the liquid crystal cell 11 of the liquid crystal display panel 1 and the liquid crystal cell 21 of the viewing angle control panel 2. In other words, for example, if the upper polarizing plate 12 for the liquid crystal panel has been subjected to a diffusion treatment, then the effect of narrowing a viewing angle is blocked.

Embodiment 3

A further embodiment of the present technology is described below with reference to FIGS. 17 through 19. Note that the arrangement that is not described in Embodiment 3 is the same as in Embodiment 1, and that, for convenience of explanation, same members in Embodiment 3 as those in Embodiment 1 are assigned the same reference numerals and the description of the members is omitted.

In each of the liquid crystal displays 50 and 50a of Embodiment 2, polarizing plates, which have not been subjected to a diffusion treatment, are included between the liquid crystal cell 11 of the liquid crystal display panel 1 and the liquid crystal cell 21 of the viewing angle control panel 2, in addition to either the lens sheet 41 or the first lens sheet 41a and the second lens sheet 41b.

However, the present technology is not necessarily limited to this. The effect of narrowing a viewing angle is brought about by an arrangement in which polarizing plates, which have not been subjected to a diffusion treatment, are provided between the liquid crystal cell 11 of the liquid crystal display panel 1 and the liquid crystal cell 21 of the viewing angle control panel 2, even if the lens sheet 41 is not provided or even if the first lens sheet 41a and the second lens sheet 41b are not provided.

As shown in FIG. 17, a liquid crystal display 60 of the present embodiment includes: the backlight 3; the liquid crystal display panel 1 provided on the backlight 3; and the viewing angle control panel 2 provided on the liquid crystal display panel 1. Thus, the liquid crystal display 60 does not include a lens sheet 41, or a first lens sheet 41a and a second lens sheet 41b.

FIG. 17 also shows an arrangement in which the viewing angle control panel 2 is provided on the liquid crystal display panel 1. However, the present embodiment is not necessarily limited to this. Specifically, it may be arranged such that the liquid crystal display panel 1 and the viewing angle control panel 2 are layered in the reverse order so that the liquid crystal display panel 1 is provided on the viewing angle control panel 2.

The following description deals with performance of the liquid crystal display 60, with reference to (a) through (c) of FIG. 18, and (a) through (c) of FIG. 19. (a) of FIG. 18 is a chart illustrating a luminance distribution in a wide viewing angle mode of the liquid crystal display 60. (b) of FIG. 18 is a graph illustrating a luminance-polar angle characteristic in the horizontal direction with regard to (a) of FIG. 18. (c) of FIG. 18 is a graph illustrating a luminance-polar angle characteristic in the vertical direction with regard to (a) of FIG. 18. Further, (a) of FIG. 19 is a chart illustrating a luminance distribution in a narrow viewing angle mode of the liquid crystal display 60. (b) of FIG. 19 is a graph illustrating a luminance-polar angle characteristic in the horizontal direction with regard to (a) of FIG. 19. (c) of FIG. 19 is a graph illustrating a luminance-polar angle characteristic in the vertical direction with regard to (a) of FIG. 19.

As is clear from (a) through (c) of FIG. 19, the viewing angle becomes narrower, as compared to the viewing angle shown by the luminance distributions in FIG. 6 of Embodiment 1. The effect of narrowing a viewing angle is also clear from a comparison of the luminance distribution in the wide viewing angle mode shown in (a) of FIG. 18 and the luminance distribution in the wide viewing angle mode shown in FIG. 7 of Embodiment 1.

As described above, the liquid crystal display 60 of the present embodiment does not include the lens sheet 41, or the first lens sheet 41*a* and the second lens sheet 41*b*.

However, according to the present embodiment, the lower polarizing plate 23 for the control panel and the upper polarizing plate 12 for the liquid crystal panel, which have not been subjected to a diffusion treatment, are included between the liquid crystal cell 11 of the liquid crystal display panel 1 and the liquid crystal cell 21 of the viewing angle control panel 2. The liquid crystal display 60 simply having this arrangement is capable of enhancing effect of narrowing a viewing angle.

A liquid crystal display panel 1 of Embodiment 1, 2, or 3 may be a transmissive liquid crystal display panel, a reflective liquid crystal display panel, or a semi-transmissive liquid crystal display panel.

The present technology is applicable to a liquid crystal display which includes a backlight, a display panel, and a viewing angle control panel for controlling the viewing angle of the display panel. The liquid crystal display may be a display such as a transmissive liquid crystal display, a reflective liquid crystal display, or a semi-transmissive liquid crystal display.

The invention claimed is:

1. A liquid crystal display, comprising:
    a backlight;
    a display panel;
    a viewing angle control panel for controlling a viewing angle of the display panel; and a lens sheet provided either (i) between the backlight and the display panel which is provided so as to be closer to the backlight than to the viewing angle control panel, or (ii) between the backlight and the viewing angle control panel which is provided so as to be closer to the backlight than to the display panel, wherein
    the viewing angle control panel includes:
    a liquid crystal cell; and
    a driving circuit for applying a voltage to the liquid crystal layer, said liquid crystal cell including:
    a pair of light-transmitting substrates; and
    a liquid crystal layer, provided between the light-transmitting substrates, in which liquid crystal molecules are aligned vertically when no voltage is applied, and
    the liquid crystal cell of the viewing angle control panel being provided between two polarizing plates which face each other so that polarizing transmission axes are substantially orthogonal to each other, and
    the driving circuit causing an alignment of the liquid crystal molecules in the liquid crystal layer of the liquid crystal cell of the viewing angle control panel to be switched between a first alignment and a second alignment so that a display state is switched between a first viewing angle range and a second viewing angle range which is within the first viewing angle range and is narrower than the first viewing angle range,
    said first viewing angle range occurring when a first voltage is applied to the liquid crystal layer, and said second viewing angle range occurring when a second voltage that is different from said first voltage is applied to the liquid crystal layer, and
    said first alignment being an alignment in which molecular long axes of the liquid crystal molecules are parallel to surfaces of the light-transmitting substrates, and said second alignment being an alignment in which the molecular long axes of the liquid crystal molecules are slanted with respect to the normals of the light-transmitting substrates.

2. The liquid crystal display according to claim 1, wherein each of the display panel and the viewing angle control panel includes a liquid crystal cell,
    said liquid crystal display, further comprising:
    at least one polarizing plate, which has not been subjected to a diffusion treatment, provided between the liquid crystal cell of the display panel and the liquid crystal cell of the viewing angle control panel.

3. A liquid crystal display, comprising:
    a backlight;
    a display panel;
    a viewing angle control panel for controlling a viewing angle of the display panel; and
    a plurality of layered lens sheets provided either (i) between the backlight and the display panel which is provided so as to be closer to the backlight than to the viewing angle control panel, or (ii) between the backlight and the viewing angle control panel which is provided so as to be closer to the backlight than to the display panel, wherein
    the viewing angle control panel includes:
    a liquid crystal cell; and
    a driving circuit for applying a voltage to the liquid crystal layer, said liquid crystal cell including:
    a pair of light-transmitting substrates; and
    a liquid crystal layer, provided between the light-transmitting substrates, in which liquid crystal molecules are aligned vertically when no voltage is applied, and
    the liquid crystal cell of the viewing angle control panel being provided between two polarizing plates which face each other so that polarizing transmission axes are substantially orthogonal to each other, and
    the driving circuit causing an alignment of the liquid crystal molecules in the liquid crystal layer of the liquid crystal cell of the viewing angle control panel to be switched between a first alignment and a second alignment so that a display state is switched between a first viewing angle range and a second viewing angle range which is within the first viewing angle range and is narrower than the first viewing angle range,
    said first viewing angle range occurring when a first voltage is applied to the liquid crystal layer, and said second viewing angle range occurring when a second voltage that is different from said first voltage is applied to the liquid crystal layer, and
    said first alignment being an alignment in which molecular long axes of the liquid crystal molecules are parallel to surfaces of the light-transmitting substrates, and said second alignment being an alignment in which the molecular long axes of the liquid crystal molecules are slanted with respect to the normals of the light-transmitting substrates.

4. The liquid crystal display according to claim 3, wherein the plurality of layered lens sheets are made up of a first lens sheet and a second lens sheet, the first lens sheet being provided so as to be closer to the backlight and having a prism ridgeline pattern which is vertically stripped with respect to the display panel, and the second lens sheet being provided on the first lens sheet and having a prism ridgeline pattern which is horizontally stripped with respect to the display panel.

5. The liquid crystal display according to claim 4, wherein each of the display panel and the viewing angle control panel includes a liquid crystal cell, said liquid crystal display, further comprising:

at least one polarizing plate, which has not been subjected to a diffusion treatment, provided between the liquid crystal cell of the display panel and the liquid crystal cell of the viewing angle control panel.

6. The liquid crystal display according to claim 3, wherein each of the display panel and the viewing angle control panel includes a liquid crystal cell, said liquid crystal display, further comprising:

at least one polarizing plate, which has not been subjected to a diffusion treatment, provided between the liquid crystal cell of the display panel and the liquid crystal cell of the viewing angle control panel.

7. A liquid crystal display, comprising:

a backlight;

a display panel; and a viewing angle control panel for controlling a viewing angle of the display panel, each of the display panel and the viewing angle control panel including a liquid crystal cell, said liquid crystal display, further comprising:

at least one polarizing plate, which has not been subjected to a diffusion treatment, provided between the liquid crystal cell of the display panel and the liquid crystal cell of the viewing angle control panel, wherein the viewing angle control panel includes:

a liquid crystal cell; and a driving circuit for applying a voltage to the liquid crystal layer, said liquid crystal cell including:

a pair of light-transmitting substrates; and a liquid crystal layer, provided between the light-transmitting substrates, in which liquid crystal molecules are aligned vertically when no voltage is applied, and the liquid crystal cell of the viewing angle control panel being provided between two polarizing plates which face each other so that polarizing transmission axes are substantially orthogonal to each other, and the driving circuit causing an alignment of the liquid crystal molecules in the liquid crystal layer of the liquid crystal cell of the viewing angle control panel to be switched between a first alignment and a second alignment so that a display state is switched between a first viewing angle range and a second viewing angle range which is within the first viewing angle range and is narrower than the first viewing angle range, said first viewing angle range occurring when a first voltage is applied to the liquid crystal layer, and said second viewing angle range occurring when a second voltage that is different from said first voltage is applied to the liquid crystal layer, and said first alignment being an alignment in which molecular long axes of the liquid crystal molecules are parallel to surfaces of the light-transmitting substrates, and said second alignment being an alignment in which the molecular long axes of the liquid crystal molecules are slanted with respect to the normals of the light-transmitting substrates.

* * * * *